(12) United States Patent
Eschey et al.

(10) Patent No.: US 10,973,108 B2
(45) Date of Patent: Apr. 6, 2021

(54) LAMP WITH INCORPORATED NETWORK ACCESS POINT AND LIGHTING FACILITY HAVING A WIRELESS NETWORK

(71) Applicant: OSRAM GmbH, Munich (DE)

(72) Inventors: Michael Eschey, Wehringen (DE); Eberhard Hoefflin, Herbrechtingen (DE); Herbert Ernst, Weilheim (DE); Holger Sacher, Augsburg (DE); Bernhard Siessegger, Unterschleissheim (DE)

(73) Assignee: Osram GmbH, Munich (DE)

( * ) Notice: Subject to any disclaimer, the term of this patent is extended or adjusted under 35 U.S.C. 154(b) by 41 days.

(21) Appl. No.: 16/081,420

(22) PCT Filed: Mar. 1, 2017

(86) PCT No.: PCT/EP2017/054743
§ 371 (c)(1),
(2) Date: Aug. 31, 2018

(87) PCT Pub. No.: WO2017/149001
PCT Pub. Date: Sep. 8, 2017

(65) Prior Publication Data
US 2020/0037420 A1 Jan. 30, 2020

(30) Foreign Application Priority Data

Mar. 3, 2016 (DE) ..................... 10 2016 203 530.4

(51) Int. Cl.
*H05B 47/19* (2020.01)
*H04W 4/80* (2018.01)
(Continued)

(52) U.S. Cl.
CPC .............. *H05B 47/19* (2020.01); *F21S 8/046* (2013.01); *H01Q 1/22* (2013.01);
(Continued)

(58) Field of Classification Search
CPC ... H05B 37/0272; H05B 47/19; H04W 88/08; H04W 4/80; H04W 84/12; F21S 8/046; H01Q 1/22; G04B 7/15507; F21V 33/00
See application file for complete search history.

(56) References Cited

U.S. PATENT DOCUMENTS 8,011,794 B1 * 9/2011 Sivertsen ............. H05B 47/105
362/85
2004/0192227 A1 9/2004 Beach et al.
(Continued)

FOREIGN PATENT DOCUMENTS

DE 19639188 A1 4/1998
WO 2016016435 A1 2/2016

OTHER PUBLICATIONS

German Search Report based on application No. 10 2016 203 530.4 (9 pages) dated Nov. 21, 2016 (for reference purpose only).
(Continued)

*Primary Examiner* — Raymond R Chai
(74) *Attorney, Agent, or Firm* — Viering, Jentschura & Partner mbB

(57) ABSTRACT

A method for optimizing the area coverage of a wireless network may include a lamp to perform this method. The lamp may have an input for connecting a network, a power supply unit for supplying all components of the lamp with an electric power taken from the input, a control unit for controlling the components of the lamp, at least one light source from the power supply unit and controlled by the control unit, and a network access point for providing at least one wireless network. The lamp may include at least one antenna associated with the network access point. The light source and antenna may be arranged and designed such that the radiation characteristics of the light are congruent with the radiation characteristics of the antenna of the wireless network.

17 Claims, 19 Drawing Sheets

(51) Int. Cl.
*F21S 8/04* (2006.01)
*H01Q 1/22* (2006.01)
*H04B 7/155* (2006.01)
*H04W 88/08* (2009.01)

(52) U.S. Cl.
CPC .......... *H04B 7/15507* (2013.01); *H04W 4/80* (2018.02); *H04W 88/08* (2013.01)

(56) References Cited

U.S. PATENT DOCUMENTS

| | | |
|---|---|---|
| 2004/0204112 A1 | 10/2004 | Caci |
| 2006/0152344 A1 | 7/2006 | Mowery, Jr. |
| 2008/0315991 A1* | 12/2008 | Tuttle .................. H01Q 1/2225 340/10.1 |
| 2010/0091745 A1* | 4/2010 | Bevan .................. H04W 24/02 370/338 |
| 2012/0218978 A1 | 8/2012 | Ishidoshiro |
| 2013/0077966 A1 | 3/2013 | Gelbman et al. |
| 2013/0162166 A1 | 6/2013 | Jonsson |
| 2014/0057638 A1* | 2/2014 | Carey .................. H04W 16/18 455/446 |
| 2014/0297227 A1 | 10/2014 | Barnard |
| 2014/0300293 A1* | 10/2014 | Ruan ...................... H05B 45/00 315/294 |
| 2015/0195883 A1* | 7/2015 | Harris .................. H05B 47/105 315/155 |
| 2015/0245236 A1* | 8/2015 | Lu ...................... H04W 52/0206 370/252 |
| 2015/0259078 A1 | 9/2015 | Filipovic et al. |
| 2015/0377479 A1* | 12/2015 | Pescod .................. H01Q 15/08 362/85 |
| 2016/0091217 A1* | 3/2016 | Verberkt .................. F24F 11/30 700/276 |
| 2016/0149713 A1* | 5/2016 | Wendt ..................... H04L 12/10 307/1 |
| 2016/0205148 A1* | 7/2016 | Lee ..................... H04L 65/4084 709/219 |
| 2017/0123390 A1* | 5/2017 | Barco .................... G05B 15/02 |
| 2017/0223810 A1 | 8/2017 | Bernsen et al. |
| 2017/0325324 A1* | 11/2017 | Kwag ................... H05B 45/10 |

OTHER PUBLICATIONS

International Search Report based on application No. PCT/EP2017/054743 (16 pages) dated May 17, 2017 (for reference purpose only).

* cited by examiner

LAMP WITH INCORPORATED NETWORK ACCESS POINT AND LIGHTING FACILITY HAVING A WIRELESS NETWORK

CROSS-REFERENCE TO RELATED APPLICATION

The present application is a national stage entry according to 35 U.S.C. § 371 of PCT application No.: PCT/EP2017/054743 filed on Mar. 1, 2017, which claims priority from German Patent Application Serial No.: 10 2016 203 530.4 which was filed Mar. 3, 2016, and is incorporated herein by reference in its entirety and for all purposes.

TECHNICAL FIELD

The description relates to a lamp and a lighting facility having multiple lamps of this type.

BACKGROUND

In a rising number of department stores and office buildings, network access points for providing wireless networks such as WLAN are incorporated in lamps. The incorporation of these network access points in lamps has various advantages. First, the lamp already contains a power supply, for the most part a mains cable, which means that this does not need to be laid to the network access point especially. Secondly, lamps are evenly distributed over the floors of the building, which means that the optimum site for the access point may be selected relatively easily.

US 2004 0192227 describes integrating a network access point, such as e.g. a WLAN access point, into a lamp.

Generally, only a few lamps are equipped with powerful network access points in this case in order to achieve the best possible coverage of premises with a wireless network. The powerful network access points in this case each cover as large an area as possible so that as few network access points as possible are necessary in the installation. The reason is the increased wiring complexity. The network access point may easily be supplied with power in the lamp, since a mains voltage is present. However, every lamp having a network access point needs to be provided with an LAN cable in order to be able to link the network access point to the network. This increases the installation complexity considerably, which is why as few access points as possible are sought. FIG. 2 shows the schematic interconnection of such a facility. Two gateways 21 and 22 are shown that produce the connection to the Internet and at the same time may perform control tasks for the lamps. A building-internal network DS is then shown to which the various network access points AP #1 to AP #N are connected. These may in turn be used to connect various clients within the basis surface sets BSS #1 to BSS #N.

The large physical coverage of a single network access point means that the antenna is designed to radiate as omnidirectionally as possible. This has the disadvantage that there are overlaps in boundary areas between two network access points, interfering with reception, since many of the channels in the standardized IEEE 802.11 network are known not to be nonoverlapping and thus adjacent network access points may interfere with one another. FIG. 1 shows the channel split in a 2.4 GHz frequency band to give intervals of 5 MHz at the center frequency for a bandwidth of approximately 22 MHz. It may be seen that in the European frequency band at 2.4 GHz there are just three nonoverlapping WLAN channels with channels 1 to 13 in the case of DSSS transmission. Other frequency bands, the 5 GHz and 60 GHz bands, and other transmission techniques, e.g. OFDM, are subject to the same principle, only the number of nonoverlapping channels is variable. Thus, if the transmission power of a network access point is very high in order to achieve the desired coverage, then the potential interference for other network access points in the same network or especially for other operators is very high. Given the omnidirectional radiation properties of rod antennas, as are shown in FIG. 3, this results in problems with reception at another location.

Additionally, in the case of large radio cells, objects such as walls and furniture, as a non-limiting example, in this cell may lead to reflections or even cancellation, which likewise impairs signal quality. Specifically reflections result in multiple paths for the signal and impair reception considerably. FIG. 4 shows a floor plan for a building having network access points 41. Specifically close to or behind walls there are repeatedly radio holes 42 in which reception or good reception is not possible.

A further problem of these large radio cells is the number of subscribers. The problem is already known from GSM radio networks at busy sites. Many registered subscribers at a network access point need to share the bandwidth thereof, so that the possible data rate per subscriber very quickly becomes unreasonable.

SUMMARY

One non-limiting embodiment includes a method for optimizing the area coverage of a wireless network, having at least two lamps that have a network access point for providing at least one wireless network, and at least one antenna associated with the network access point, wherein the light source and the antenna are arranged and designed such that the radiation characteristics of the light are congruent with the radiation characteristics of the antenna of the wireless network referenced to one or more reference areas, wherein the following steps may be performed:

1. computing the locations of equal field strength for all network access points with reference to a predetermined reference area,
2. computing whether there are locations on the reference area at which the field strength is not reached,
3. if so, increasing the transmission power of a network access point close to the location,
4. repeating steps 2 and 3 until at least the field strength according to step 1 prevails at all locations,
5. computing whether there are locations with reducible field strength on the reference area,
6. if so, reducing the transmission power of the network access point that may be reduced to the greatest extent,
7. repeating steps 5 and 6 until there are no further reducible network access points,
8. checking whether there are as yet uncomputed network access points,
9. if so, computing an as yet uncomputed network access point,
10. repeating step 9 until all network access points have been computed.

This method additionally allows the use of known light planning tools based on the radiation characteristics of the lamps, and hence at the same time accomplishment of the planning of the wireless network.

Another non-limiting embodiment includes a lamp, having an input for connecting a network having an integrated power supply, a power supply unit for supplying all components of the lamp with an electric power taken from the input, a control unit for controlling the components of the lamp, at least one light source supplied from the power supply unit and controlled by the control unit, a network access point for providing at least one wireless network, which network access point is supplied from the power supply unit and coupled to the network via the input, at least one antenna associated with the network access point, wherein the light source and the antenna are arranged and designed such that the radiation characteristics of the light are congruent with the radiation characteristics of the antenna of the wireless network referenced to at least one reference area. The reference area may be e.g. the floor of the room in which the lamp is installed. The reference area may, however, just as often as used in the calculations for the office lighting, be a plane at the level of the desk surface that is oriented precisely in the manner of the desk surface in the room. It is also conceivable to use multiple reference areas, since in special environments such as warehouses it may also be desirable for a lamp to radiate light into more than one half-space, e.g. likewise upward. Fundamentally, however, it may be assumed that radiation especially into a half-space is of interest.

A solution as described may advantageously allow very simple installation of a lighting system to be ensured, since the network cable merely carries protective extra low voltage and installation requires no skilled personnel such as electricians, as a non-limiting example. Additionally, a lighting system based on this type of lamp may be equipped with distinctly more network access points, which may advantageously increase the average data rate per subscriber. The congruence between radiation of light and radio coverage of the lamp allows reliable coverage of the radio networks to be ensured without complex measurements.

In this context, congruent means that the radiation characteristics have substantially the same shape and also approximately the same magnitude on a reference area, such as the ground, as a non-limiting example. Since the radiation characteristics of light and radio waves may not be identical dependent on wave length, the radiation response may, in places, no longer be congruent, but rather only similar. The only important aspect in this context is that visible light also allows the minimum coverage of the wireless network to be seen.

In a non-limiting embodiment, the wireless network is a WLAN network based on the IEEE 802.11 standard. WLAN or Wi-Fi is the most widely used standard for wireless communication in the consumer sector and is supported by almost all mobile devices.

In a further non-limiting embodiment, the wireless network is a ZigBee network based on the IEEE 802.15.4 standard. ZigBee is also known on account of its networking capabilities and may be present here instead of or in addition to the WLAN.

In another non-limiting embodiment, the wireless network is a Bluetooth network based on the IEEE 802.15.1 standard. Bluetooth is also a widely used standard and is readily used for short-range communication. In this case too, the network may work alone in one embodiment, and beside the WLAN and/or the ZigBee network in another embodiment. In the embodiment having multiple parallel networks, it is necessary to make sure that the channels used for the various networks do not use the same frequency band, since otherwise interference occurs.

In another non-limiting embodiment, the network access point uses at least one of the frequency bands provided in the standard: 2.4 GHz, 5 GHz, 60 GHz. These frequency bands are standardized and predominantly accessible freely and without licenses. Thus, they are very widely used and the network access points are therefore very inexpensive to manufacture.

In a non-limiting embodiment, the at least one antenna is a biquad antenna. This type of antenna has a very similar radiation characteristic to a conventional ceiling light, and thus this antenna is particularly suitable for the desired application.

In a further non-limiting embodiment, the network access point is set up to form a mesh network with adjacent network access points. Mesh networks have the great advantage that two subscribers that have no direct network connection may communicate with one another. The information is routed from the sender to the receiver via multiple points in the network. For this reason, the range of the radio link between subscriber and network access point may be comparatively small, and two subscribers in the mesh network may nevertheless communicate over long distances via many network access points.

Regardless of whether or not the lamp operates in a mesh network, the network access point may be set up to allow handover of a subscriber to another network access point according to the IEEE 802.11f and/or IEEE 802.11r standard. This allows a stable network connection for a moving subscriber over multiple network access points.

Particularly, the input of the lamp is PoE (Power over Ethernet) compatible, and the power supply unit receives its power via PoE. This measure allows simple wiring and a safe power supply to be ensured given conformity with an established standard.

The description likewise relates to a lighting facility having multiple lamps as described above. Such a lighting facility is particularly simple to install and maintain and is particularly reliable in network operation.

As described above, a handover of a subscriber between lamps of the lighting facility may take place according to the IEEE 802.11f and/or IEEE 802.11r standard. This measure achieves a stable network connection within the entire lighting facility, especially also with moving subscribers. Particularly this property is combined with a mesh network. This ensures sufficient point-to-point communication within the entire lighting facility, without the two subscribers needing to have a direct radio link to the same network access point. Above all, communication over multiple floors may also be established in this case, without the network access points needing to be connected to the same switch.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
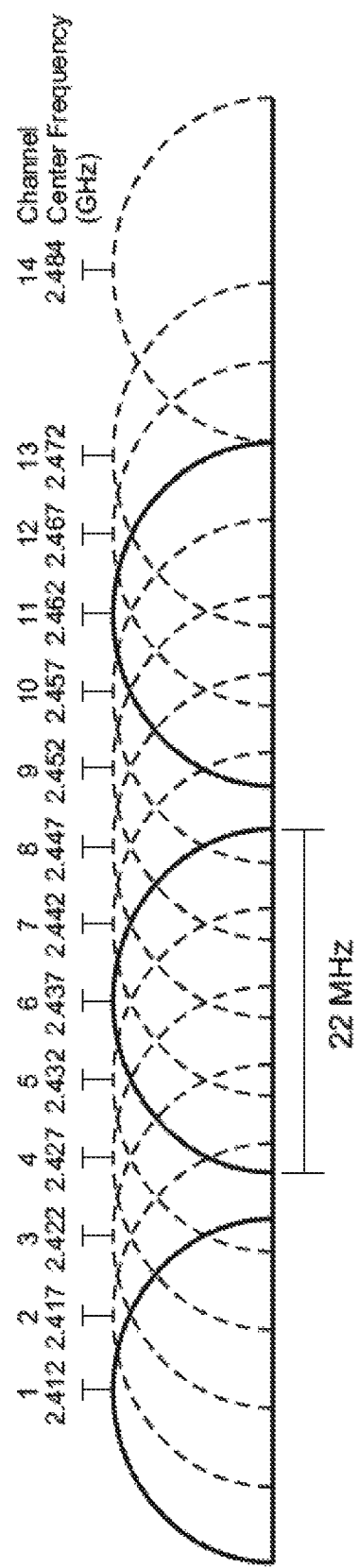
FIG. 1 shows a graph of the overlapping channels of a WLAN radio network, it being visible that the European 2.4 GHz band has just three nonoverlapping channels in the case of DSSS transmission technology.
Figure 2:
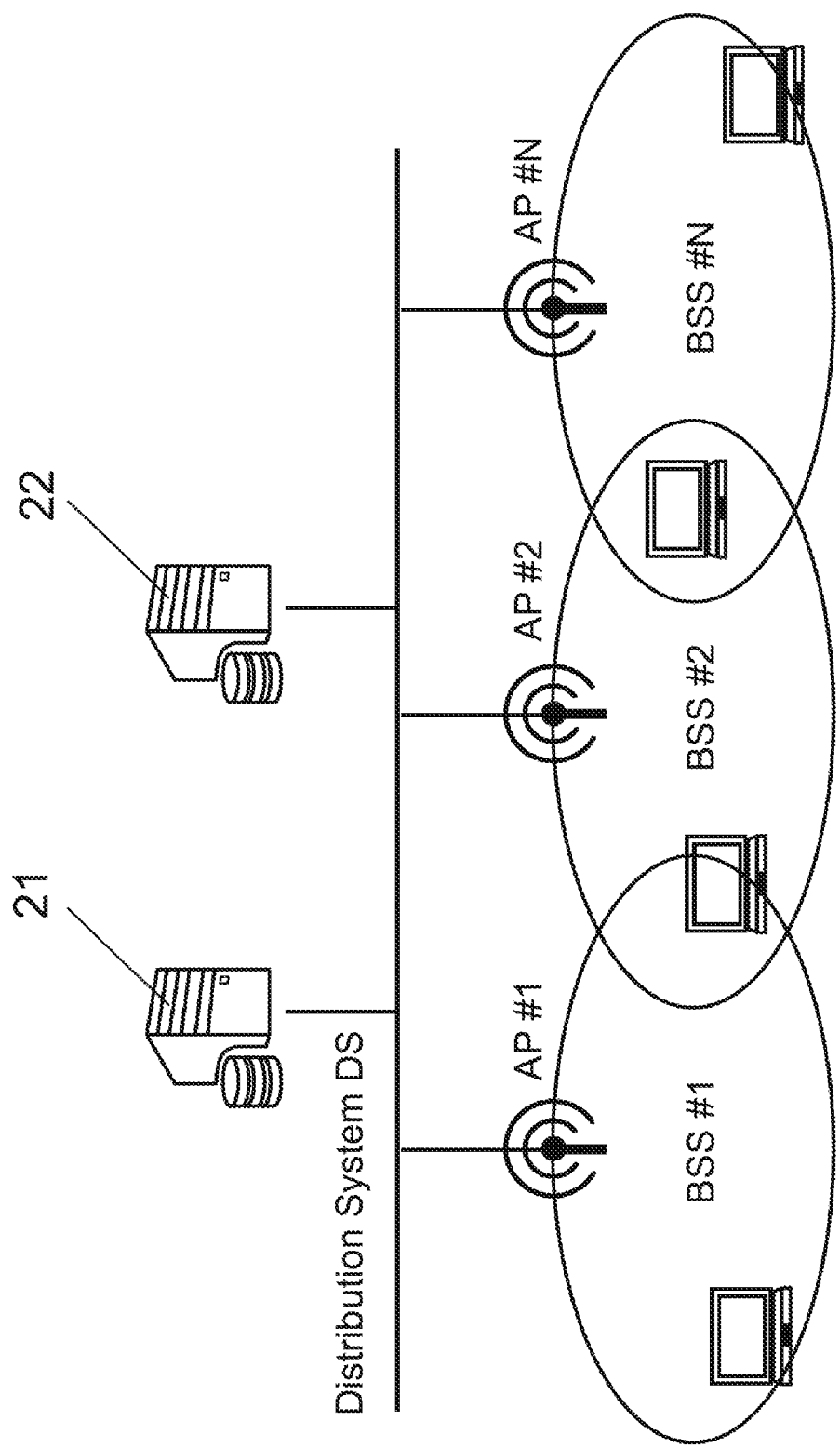
FIG. 2 shows a schematic depiction of a network having few powerful network access points.
Figure 3:
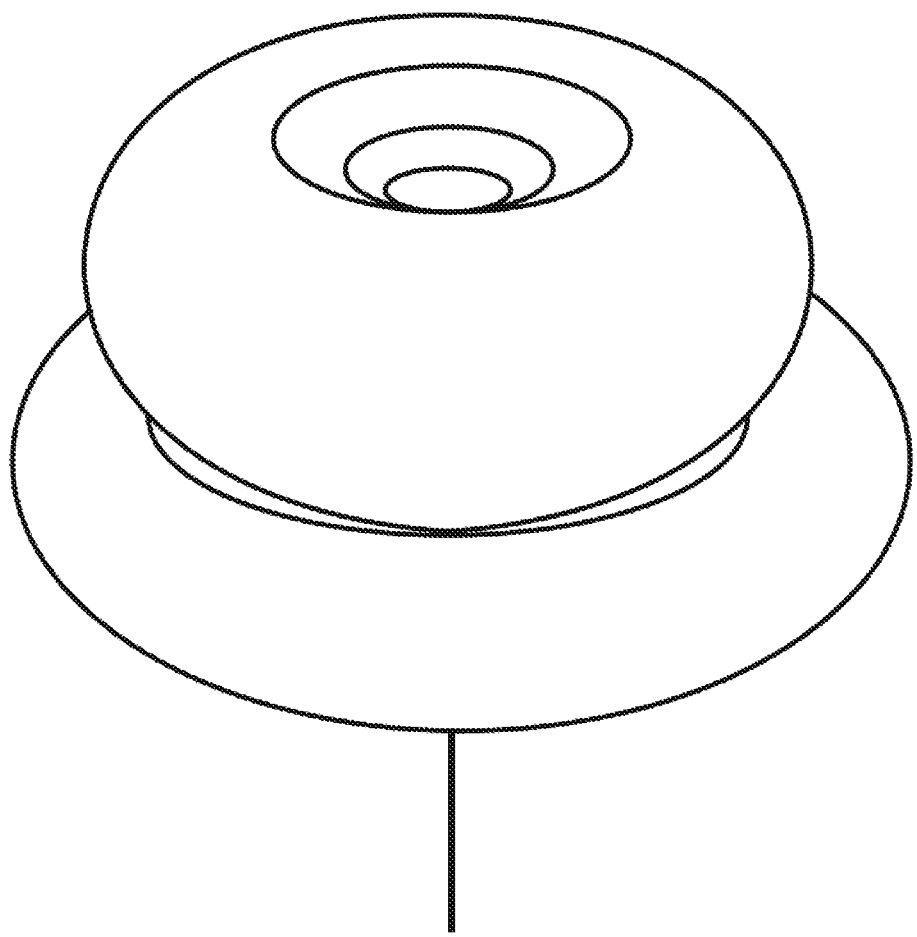
FIG. 3 shows the omnidirectional radiation characteristic of a rod antenna.
Figure 4:
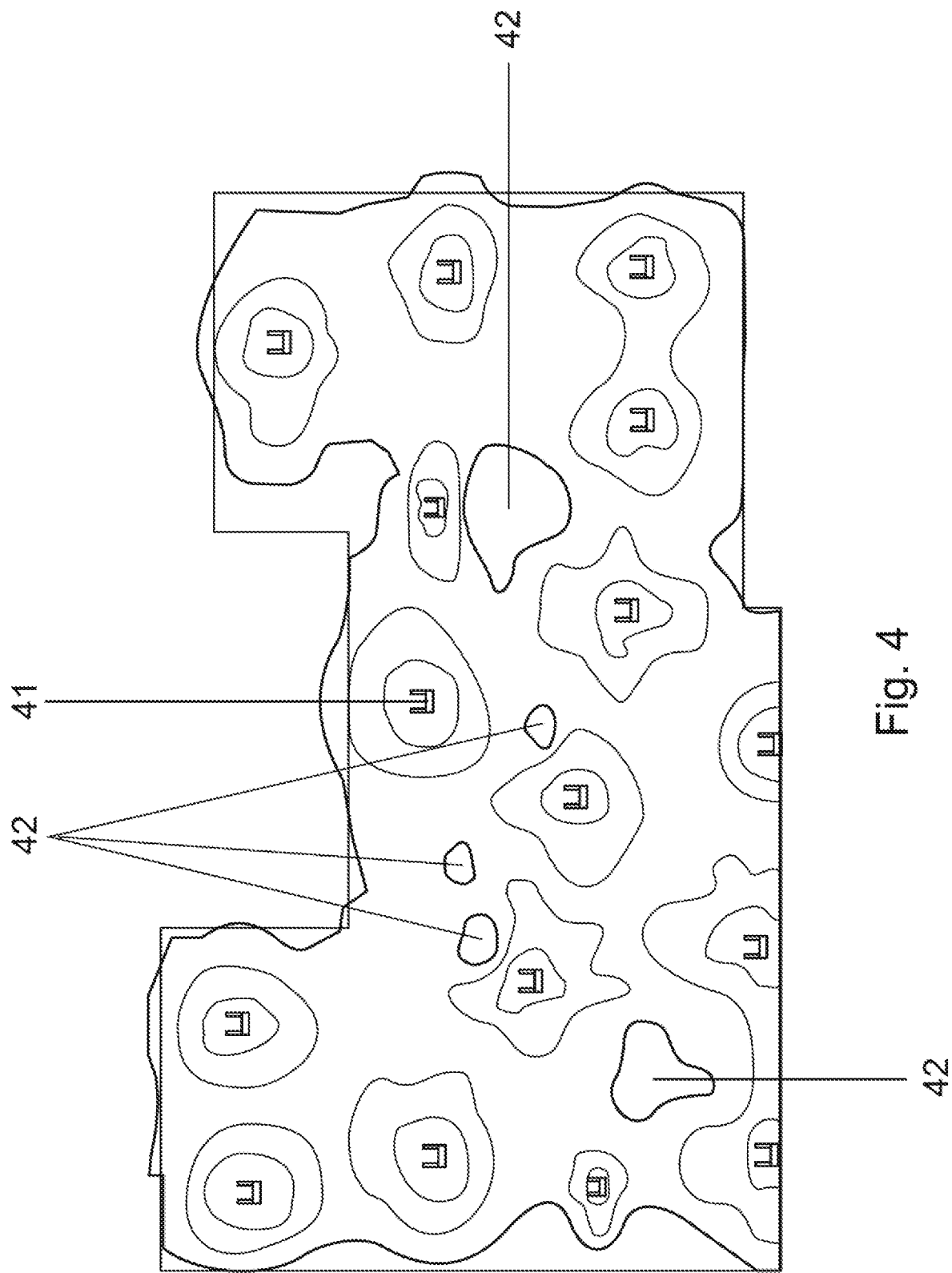
FIG. 4 shows a non-limiting example of the computed WLAN coverage for a floor of a building in a lighting facility.
Figure 5:
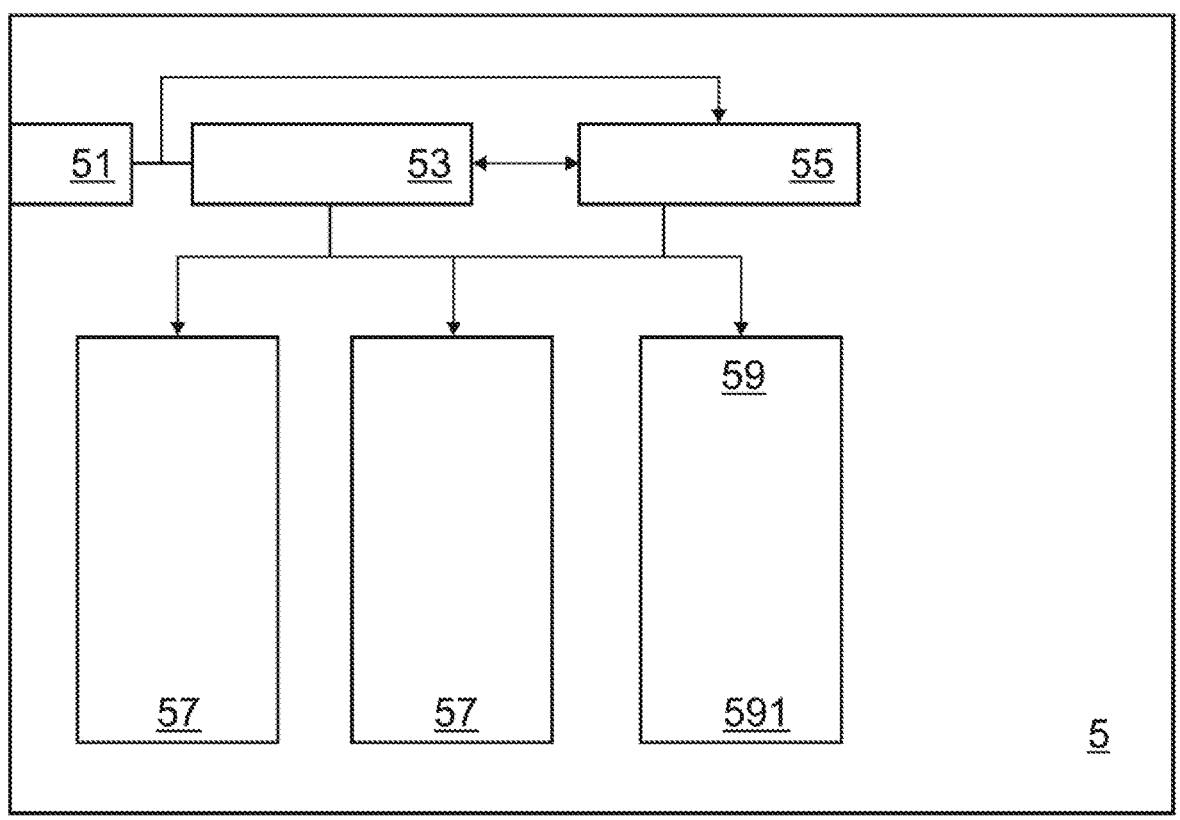
FIG. 5 shows a schematic depiction of a lamp according to the description.

FIG. 5 shows a schematic depiction of a lamp 5 according to the description. The lamp 5 has an input 51 for connecting a network having an integrated power supply. The integrated power supply is compatible with the PoE standard based on IEEE 802.3af and 802.3at and with the future IEEE 802.3bt standard. In order to be able to use the power transmitted via the network, the lamp 5 has a power supply unit 53 that isolates the electrical power from the useful signal and conditions it for the components of the lamp. The useful signal of the network is supplied to a control unit 55 that processes the data. This involves pure network data e.g. from the Internet being isolated from control commands for the lamp. The pure network data are forwarded to an access point 59, and the control commands are executed, or forwarded to the two LED modules 57, which execute the commands accordingly. The access point 59 operates a wireless network based on the WLAN standard. In a further non-limiting embodiment, the access point additionally also operates a ZigBee and/or Bluetooth network. The access point has an antenna 591 by means of which the wireless network is operated. In this case, the antenna is configured as a biquad antenna having a reflector, the radiation characteristic of which matches the radiation characteristic of the LED modules. The two radiation characteristics are substantially congruent in this case, which means that there is also good network coverage of the wireless network when the room is evenly illuminated by means of multiple instances of the lamps.

In a first non-limiting embodiment, the mains connections are dispensed with completely for each lamp, and each lamp is supplied with power via a network cable. For this, the now widely used Power over Ethernet (PoE) standard based on IEEE 802.3af or at is used. For larger area lamps, the still quite new IEEE 802.3bt is also used. The more recent IEEE 802.3at standard permits up to 25.4 W of power to be transmitted via the network cable. The future IEEE 802.3bt standard will probably permit at least 50 W of power to be transmitted per network cable. This is enough for modern LED lamps in order to ensure excellent lighting quality. In general, it may be stated that the proposed embodiment moves away from a few lamps equipped with large and powerful access points toward lamps with more equipment that are then supplied with power no longer via the mains but rather via PoE.

This solution has the advantage of considerably simplified wiring, since it is now only necessary for network cables to be laid to the respective lamps, and the lamps are then plugged in only by means of the known RJ45 connector. Since the network cables carry only protective extra low voltage, the installation may be performed by anyone and no longer needs to be accomplished by specially trained personnel as with mains voltage.

In the proposed embodiment, the access points 59, that is to say the network access points, are also much lower power, since they now only have to supply power to a much smaller area, of course, which may be accomplished at lower power. In the case of modern access points, it may be assumed that they require below 0.5 W in sleep mode and only approximately one watt of power during operation. This may easily be accomplished by means of PoE, also in addition to the required power for the lighting. Additionally, when there are a large number of small access points 59 in the lamps 5, it is more likely that an access point is currently not being used and may be put into a power-saving sleep mode. The power is supplied in this case by a power supply unit 53 having a connected control part 55 that isolates the supply power from the data, and interprets and executes control data that the data contain for the lamp in the same way. This power supply unit 53 is thus connected between the input of the lamp and the access point or a lamp module 57 of the lamp. The lamp module 57 accommodates one or more light sources such as LEDs or LED modules. The lamp module 57 in this case has a particular light radiation characteristic, as is customary for lamps of this type.

Figure 6:
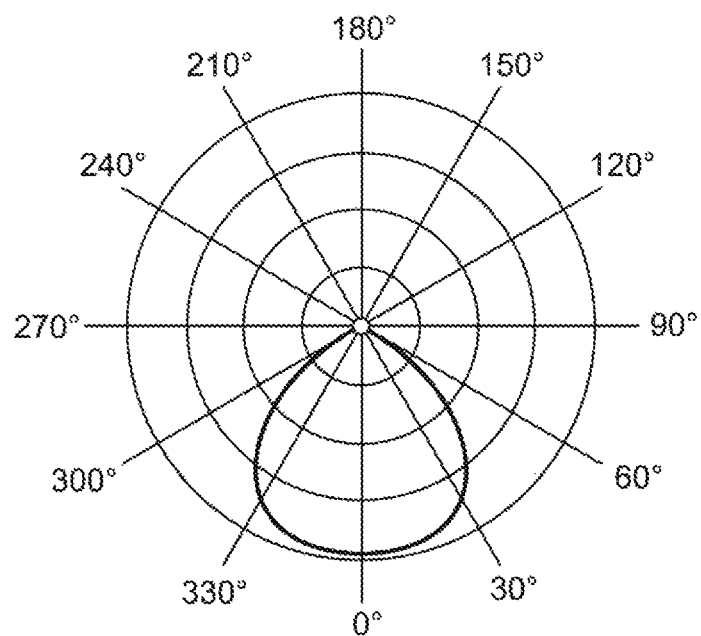
FIG. 6 shows an exemplary radiation characteristic for a ceiling light.

FIG. 6 shows the radiation characteristic of such a light module. Depending on the design of the lighting system, the characteristic may be adjusted and the radiation angle of the lamp module may be chosen accordingly. In the non-limiting example below, the lamp has a very narrow, direct radiation angle of just 30°. As a result, a good luminous intensity may be achieved beneath the lamp, and an appropriate number of lamps means that the light distribution in the room is good despite the narrow radiation angle.

The beauty of the proposed embodiment is now the fact that the access point incorporated in the lamp has a radiation characteristic that is substantially consistent with that of the lamp module. This has the inestimable advantage that a light planner planning the lighting in a building plans an optimally designed WLAN network at the same time in the course of this planning. The reason is that if the light planning results in an even luminous intensity in the room, this automatically also results in excellent coverage by means of WLAN or accordingly another radio network. To achieve this, the rod antennas usually used are no longer adequate. It is necessary to use antennas having an asymmetric radiation characteristic, such as biquad antennas, as a non-limiting example. Like the lamp modules, these have a reflector that focusses the radiation into a hemisphere. Depending on the antenna shape, radiation characteristics are then obtained that are congruent with those of light. Naturally, the "lobe" cannot turn out to be exactly the same owing to the different wavelength, but good similarity may be achieved that becomes almost congruent.

Figure 7:
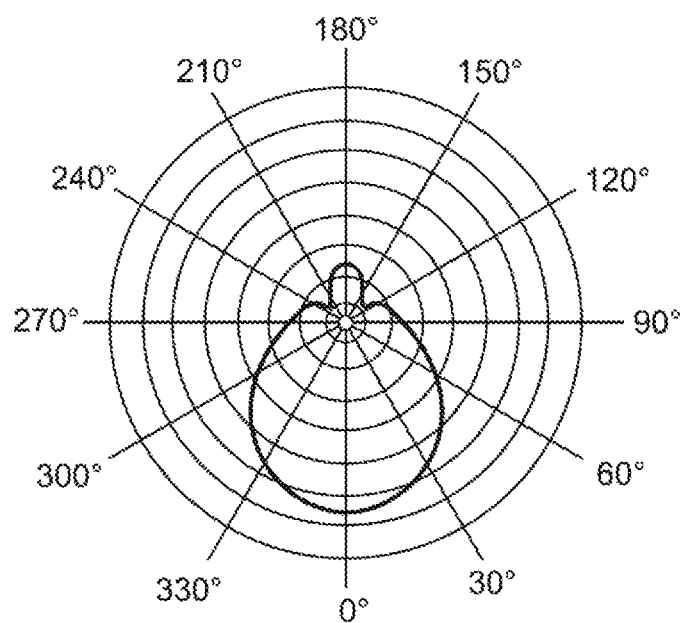
FIG. 7 shows the radiation characteristic of a biquad antenna.
Figure 8:
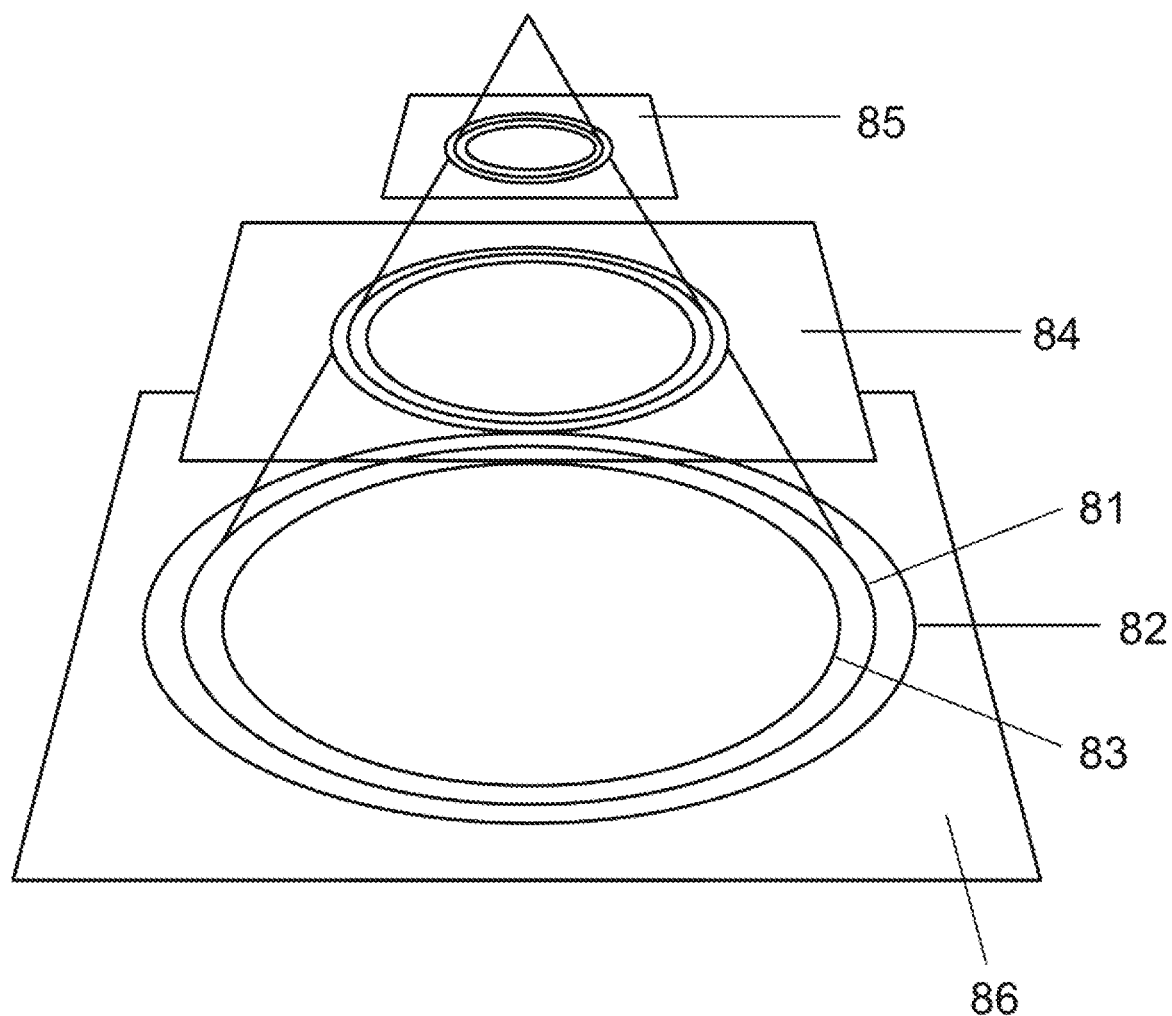
FIG. 8 shows an idealized conical radiation characteristic for a ceiling light with a 30° radiation angle and the +−3° tolerance for the radio coverage.

FIG. 7 shows the radiation characteristic of such a biquad antenna. In comparison with FIG. 6, it may be seen that there is a very similar radiation characteristic in this case. To achieve this, it is naturally necessary for each frequency band used to use its own antenna in order to allow congruence in this case. For this, an idealized model as shown in FIG. 8 is assumed, which shows an idealized radiating cone of electromagnetic radiation. In this case, the cone has a radiation angle of 30°. The middle one 81 of the circles is the angle for the radiated light on the reference plane 86. The other two circles denote the +−3° line, corresponding to a tolerance of +−10%, within which the radiation of the WLAN should be. Provided this is achieved, it is possible to refer to congruence between the light radiation and the radio radiation. This congruence naturally needs to be referenced to a particular reference plane, since the radiation characteristics in the room may be different. The reference plane 86 on which the circles are situated is the floor in this case. The consideration may likewise be employed for other reference planes, however, e.g. the reference planes 84 or 85. These planes may represent e.g. the heights of the desk surfaces of office desks. In the case of modern raisable office desks, there are at least two planes for each final position of the desk, of course.

If the 60 GHz frequency band for WLAN is likewise intended to be used, then the distinctly different frequency from the two established bands at 2.4 GHz and at 5 GHz means that a different approach to antenna design is necessary. It is not possible to use the single biquad antenna in this case. Since the extremely high frequency means that the range in the 60 GHz band is very short, antenna designs having very high gain and directivity need to be used in this case. This may be accomplished with a MIMO antenna array. This MIMO array achieves a space-time coding in which each piece of information is sent via a dedicated antenna by means of which optimum transmission to the subscriber is possible. The site of the subscriber is thus also included in the transmission path.

Figure 9:
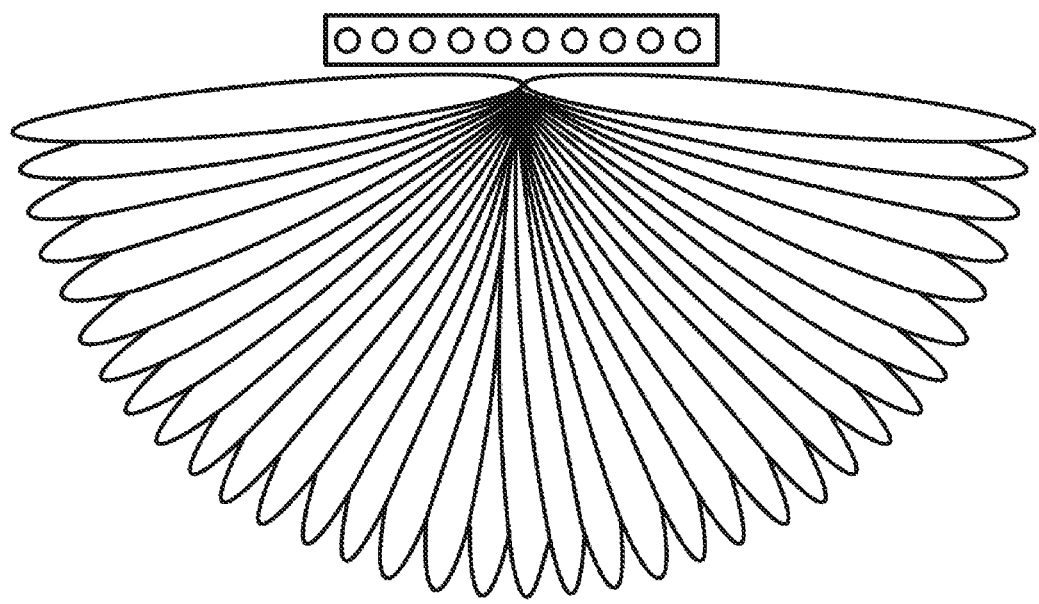
FIG. 9 shows the principle of beamforming for a radio-frequency wireless network by means of an MIMO antenna array.

FIG. 9 shows the radiation characteristics of the various antennas in such an MIMO array. The radiation is highly focused in order to achieve as high an antenna gain as possible Depending on the site of the subscriber, the antenna for which the greatest field strength may be achieved for the device of the subscriber is now activated.

Figure 10:
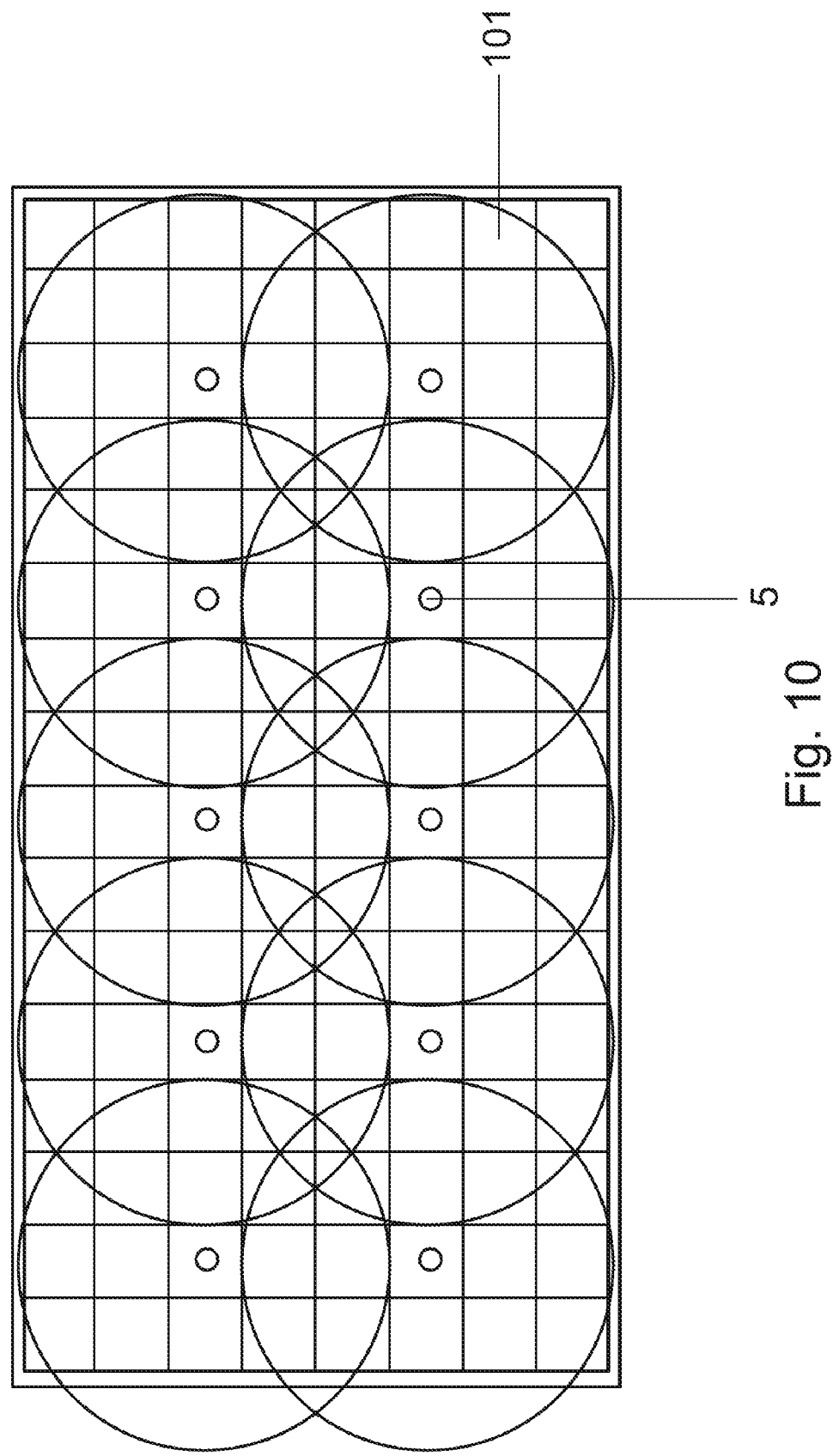
FIG. 10 shows an installation in a rectangular room according to an embodiment of the description.

FIG. 10 shows a room having a proposed lighting facility by way of non-limiting example. This room contains, as customary e.g. in the USA, 16×8 ceiling panels in a suspended ceiling of a height of 2.8 m. 10 of these ceiling panels each incorporate a lamp 5. The circle around each of these lamps denotes the area covered by the light and by the WLAN. It may be seen that the coverage with a good luminous intensity is excellent and at the same time good coverage by the radio network is achieved. Since the half-value widths of the signal strength are taken as a basis for the planning in the drawing in this case, a signal for the cell may naturally also be expected outside the area shown. Using suitable rasterization of the channels, interference from adjacent cells may be prevented in this case.

FIGS. 11 to 15 show a first application of the planning of a lighting facility together with the planning of a radio network facility having the above-described lamps 5 by way of non-limiting example.

The first application demonstrates that it is possible to use light planning tools known per se to also commission the WiFi in advance. A first method is presented below that uses the special feature of the lamps 5 to optimize the transmission power of the WiFi access points AP #1 . . . N by means of a light planning tool that is improved in comparison with known light planning tools. This application is based on the assumption that all lamps have a return channel, whether via PoE, PLC, optical transmission or a further wireless medium, to the IT backbone:

In a light planning tool, lamps 5 may be chosen in versions with directivity. These lamps have a biquad antenna or patch antenna or another suitable antenna with directivity along the vertical main axis as antenna. The RF radiation characteristic is known to the light planning tool. Also, the light planning tool optionally knows RF attenuation values for objects. From the WiFi standard for 2.4 GHz, it is known that different modulation methods also require particular signal strengths to be available at the receiver. This value is dependent on the sensitivity of the receiver and on the signal-to-noise ratio on the channel. Common values for the highest transmission rate for 802.11n are approximately −74 dBm. For the algorithm presented for the improved light planning tool, which algorithm is implemented in the improved light planning tool, this value is a parameter, that is intended to be freely selectable for the computation. The method describes how, for a chosen reference plane in the room, the transmission powers of the access points 59 may be optimized for the least possible overlap between cells and energy efficiency.

Figure 11:
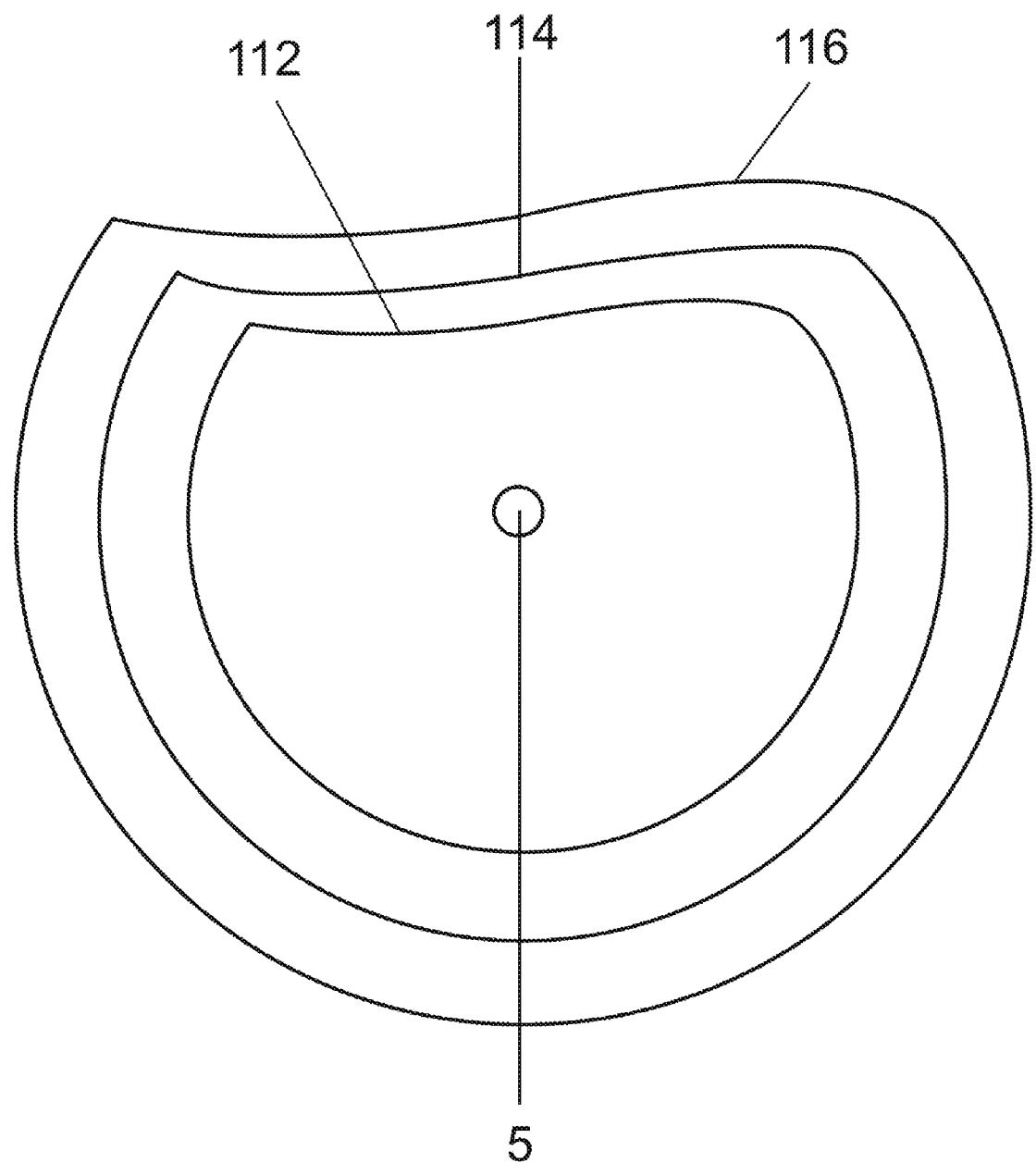
FIG. 11 shows a view of the radiation characteristic of a lamp.

FIG. 11 shows a view of the radiation characteristic of a lamp 5. The locations having the same field strength are depicted as ISO lines 112, 114, 116. From the radiation characteristics and known attenuation values of objects, the ISO lines are computed from the intersection with the reference plane (e.g. the floor or a desk surface) in the first step. The initial situation chosen is the coverage over the half-value width. The ISO line 114 is in this case the half-value width for which it would now be possible to compute a signal strength for the signal radiated by the lamp 5 that still achieves the −74 dBm proposed in the standard on the reference plane. If the signal strength is increased, then this results in a larger area coverage. The ISO line 116 is shown by way of non-limiting example in this case. If the signal strength is decreased, then this results in a smaller coverage as shown by the ISO line 112.

The half-value width defined is the radiation angle of that antenna for which it still has half the signal strength in the main direction. Since the electrical values for an antenna are readily specified logarithmically, of course, the half-value width may be found where the antenna gain is $10*\log(2)$ $=3.0103$ dB lower than on the main axis. In the literature, this is readily shortened to 3 dB. In simplified terms, it may thus be stated that the signal strength doubles every 3 dB.

Figure 12:
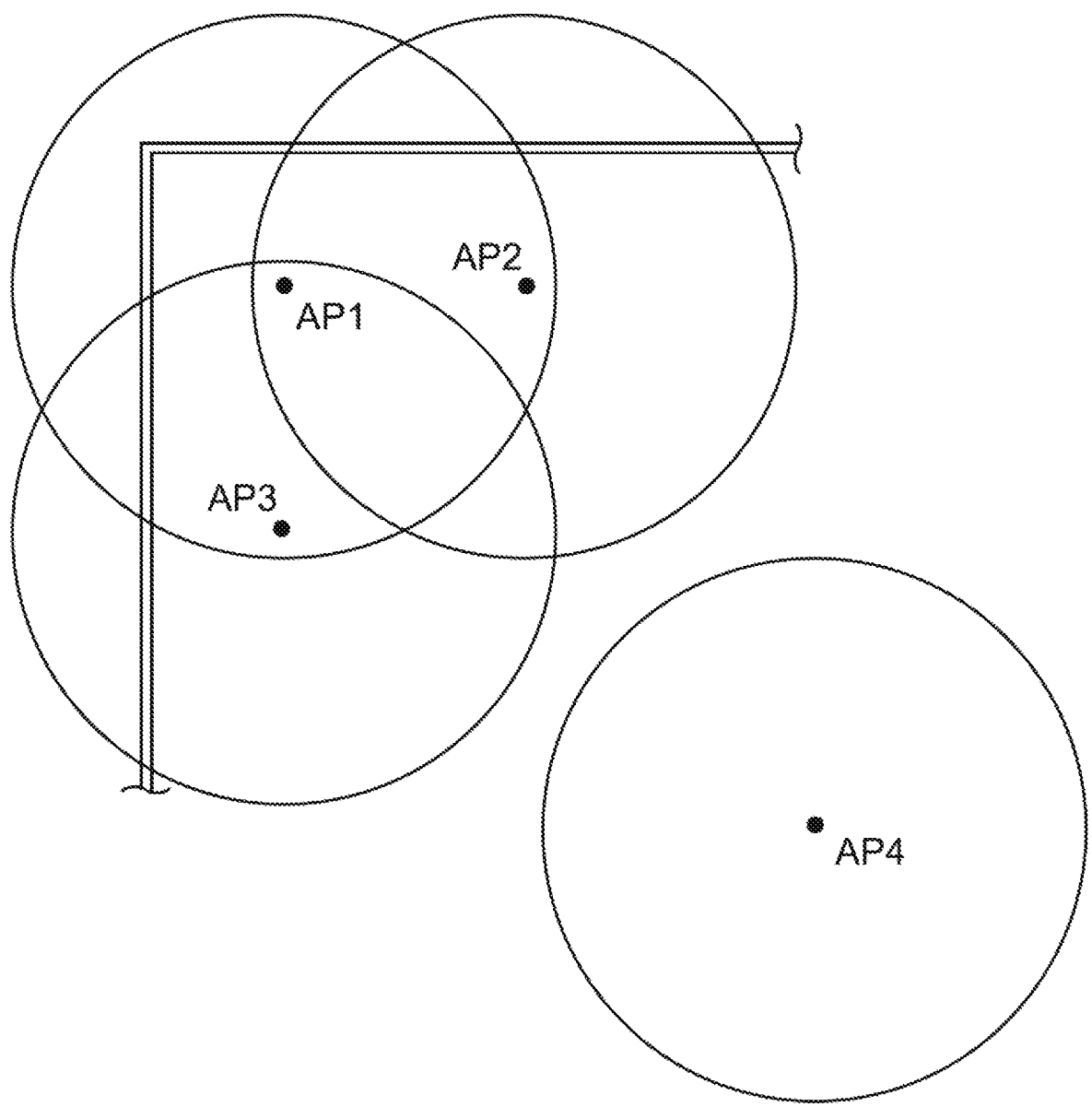
FIG. 12 shows the initial situation for part of a room having four lamps with access points AP1 to AP4, the half-value widths of which are denoted in the sectional plane before the application of an optimization method.

FIG. 12 shows a non-limiting example of the initial situation for part of a room having four lamps with access points AP1 to AP4, the half-value widths of which are denoted in the sectional plane. In this case, the half-value widths are depicted without taking into consideration attenuation and reflections, and are therefore circular.

In a second step, the lamp that results in the best ratio between coverage of still free area and overlap with already covered area when the ISO lines are extended is now chosen.

The constraint in this case is an outer ISO line 121, 122, 123, 124 as a boundary beyond which it is not possible to extend. This results from the antenna gain on the main axis plus the transmission power minus the losses as a result of cables, plug connections, etc. This total must not be above 20 dBm according to current legislation.

The −74 dBm still intended to be achieved at the most remote point are now taken into consideration and computed using a path loss model, described below. It is then possible to compute for the antenna of the lamp 5 an angle at which this constraint of the ISO line 121, 122, 123, 124 is still achieved and hence to compute the section, i.e. the outermost ISO line 121, 122, 123, 124. In most cases, especially in office buildings, this will be a theoretical limit, since distances <<10 m must be assumed in this case.

Figure 13:
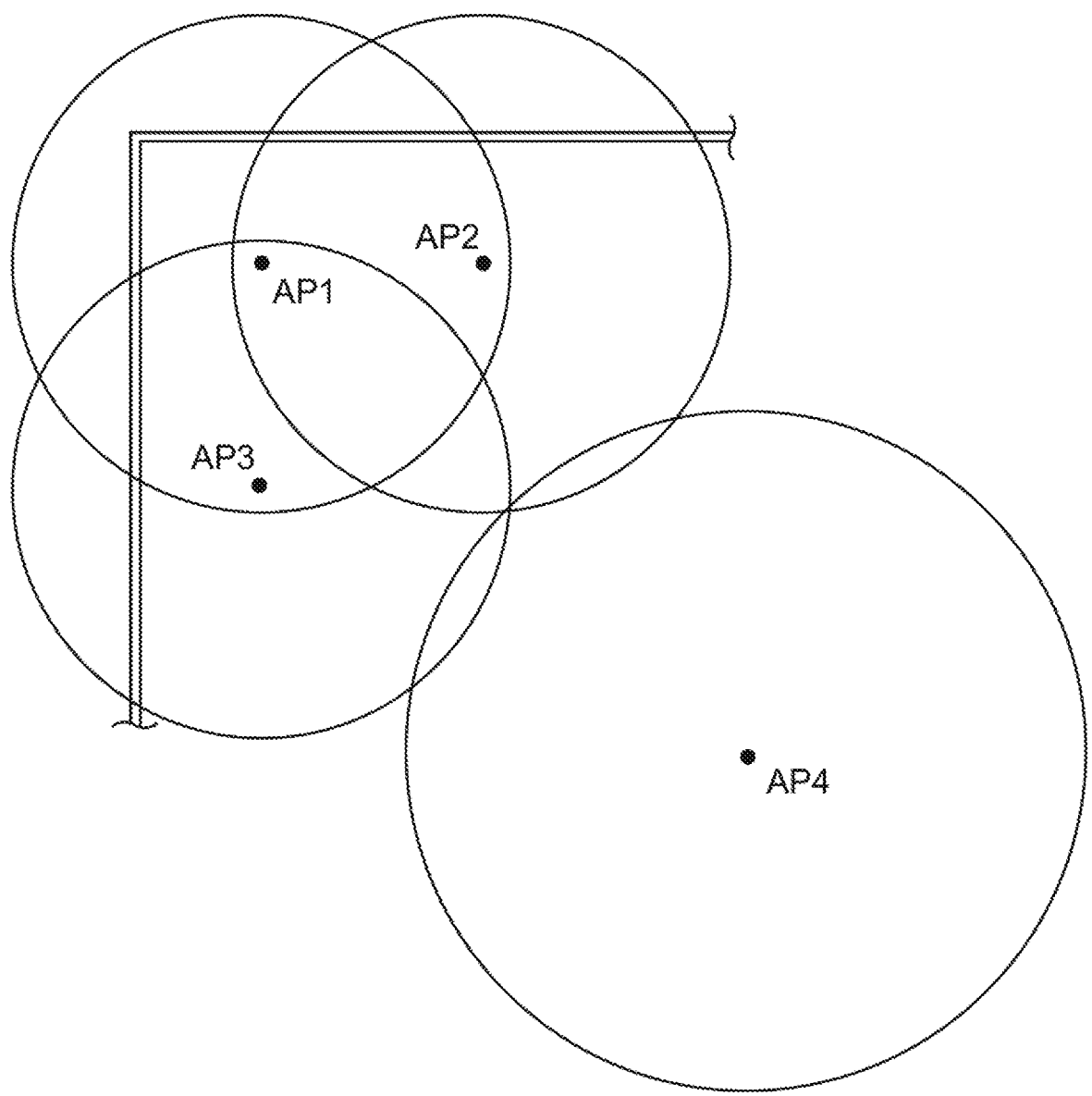
FIG. 13 shows the situation after the second step of the optimization method.

The second step is now repeated for each lamp in the lighting system until all areas are covered. FIG. 13 shows the situation after the second step.

In the third step, the lamp is now chosen for which reducing the ISO line distance results in the overlap between the areas being decreased greatest without producing free areas.

Figure 14:
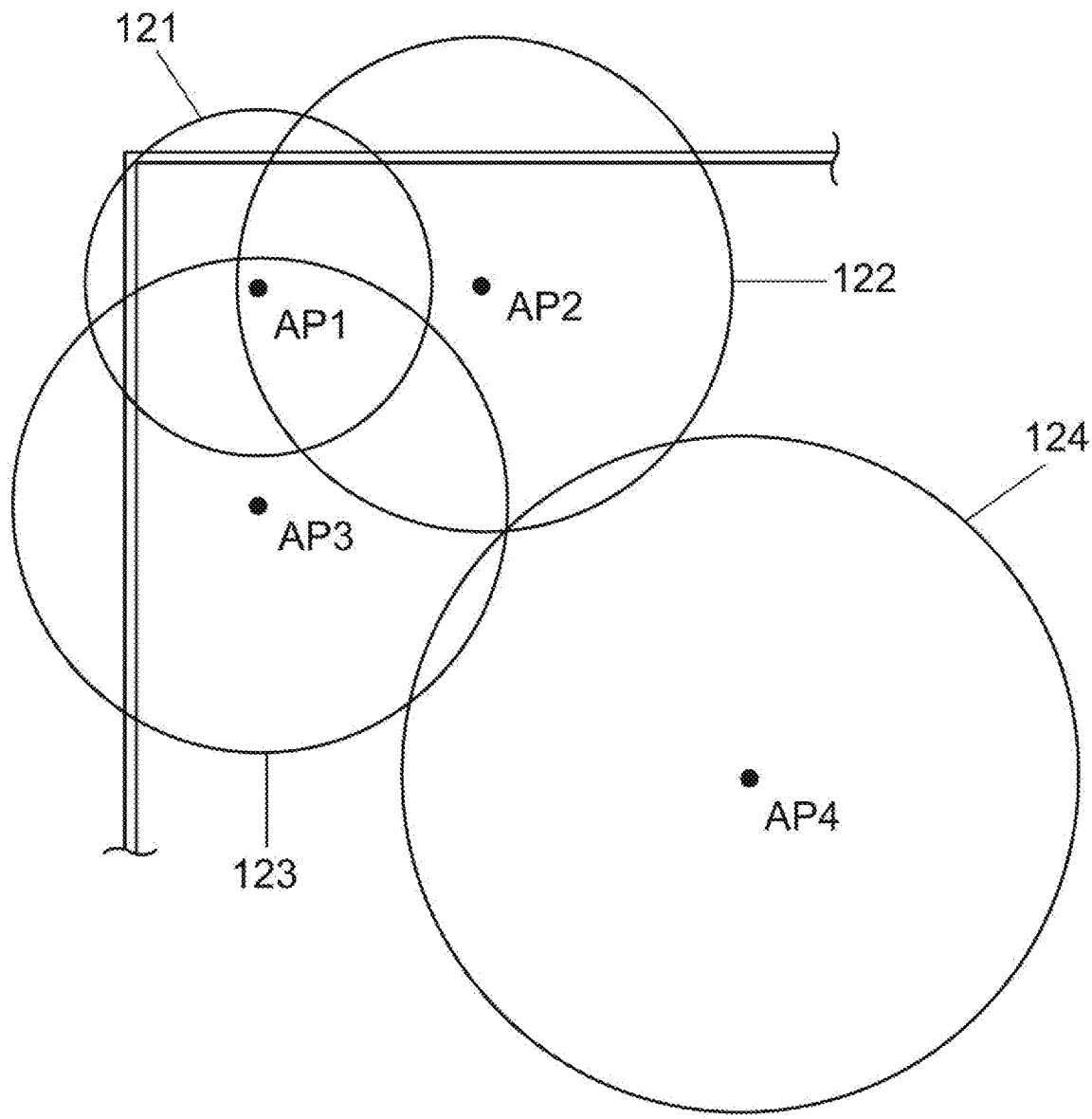
FIG. 14 shows the situation after the third step of the optimization method.

The third step is now repeated until the areas are optimized. FIG. 14 shows the situation after the third step.

In the fourth step, the optimum signal strength is now computed for each lamp. This takes place as follows:
a. From the chosen ISO line, it is now possible to infer the associated angle in the radiation characteristic of the antenna
b. The antenna gain for this angle is known
c. From the path loss model described below, the antenna gain and the desired signal strength at the most remote point, it is now possible to determine the signal strength for the access point.

The path loss model may be described as follows:

$$\text{maximum path loss} = \text{transmission power} - \text{receiver sensitivity} + \text{antenna gain} - \text{losses} - \text{fade margin}. \quad (I)$$

Losses are a parameter that is ascertained and is stored for the lamp (connection and cable losses); fade margin is an adjustable value in the planning tool. The distance d is computed as:

$$d = \text{distance (km)} = 10^{(\text{maximum path loss} - 32.44 - 20 \log(f))/20} \quad (II)$$

From the two equations (I) and (II) above, it is possible to resolve according to the "transmission power". The "fade margin" parameter describes an additional loss in comparison with free-space propagation. This value is likewise permanently set.

This results in $$\text{transmission power} = 20*\log(d) + 20*\log(f) + 32.44 + \text{fade margin} + \text{losses} - \text{antenna gain} + \text{receiver sensitivity (e.g. } -74 \text{ dBm)} \quad (III)$$

A non-limiting example with typical values for the half-value width is shown briefly below. The preset and known values are as follows:
Fade margin=5 dB
Losses=3 dB
Antenna gain 3 dB
Receiver sensitivity −74 dBm
Distance=4 m=0.004 km
f=2.45 GHz=2450 MHz The transmission power is computed therefrom as: transmission power=20*log(0.004)+20*log(2450)+32.44+5+3−3−74=−47.96+67.78+32.44+5+3−3−74=−16.74 dBm=21 µW A comparison shows the necessary transmission power at 25 times the distance at 100 meters (high coverage by an access point): power=11.22 dBm=13 mW (20*log(0.1)=−20, the increased fade margin as a result of shadowing and reflections not being taken into consideration here). The necessary transmission power at 25 times the distance is approximately five hundred times.

This method describes a specific implementation for optimizing the area coverage of a wireless network, which may also be replaced by other methods. The computation for the path loss model is always valid, however, provided that the desired reception power is known for a particular radiation angle.

Figure 15:
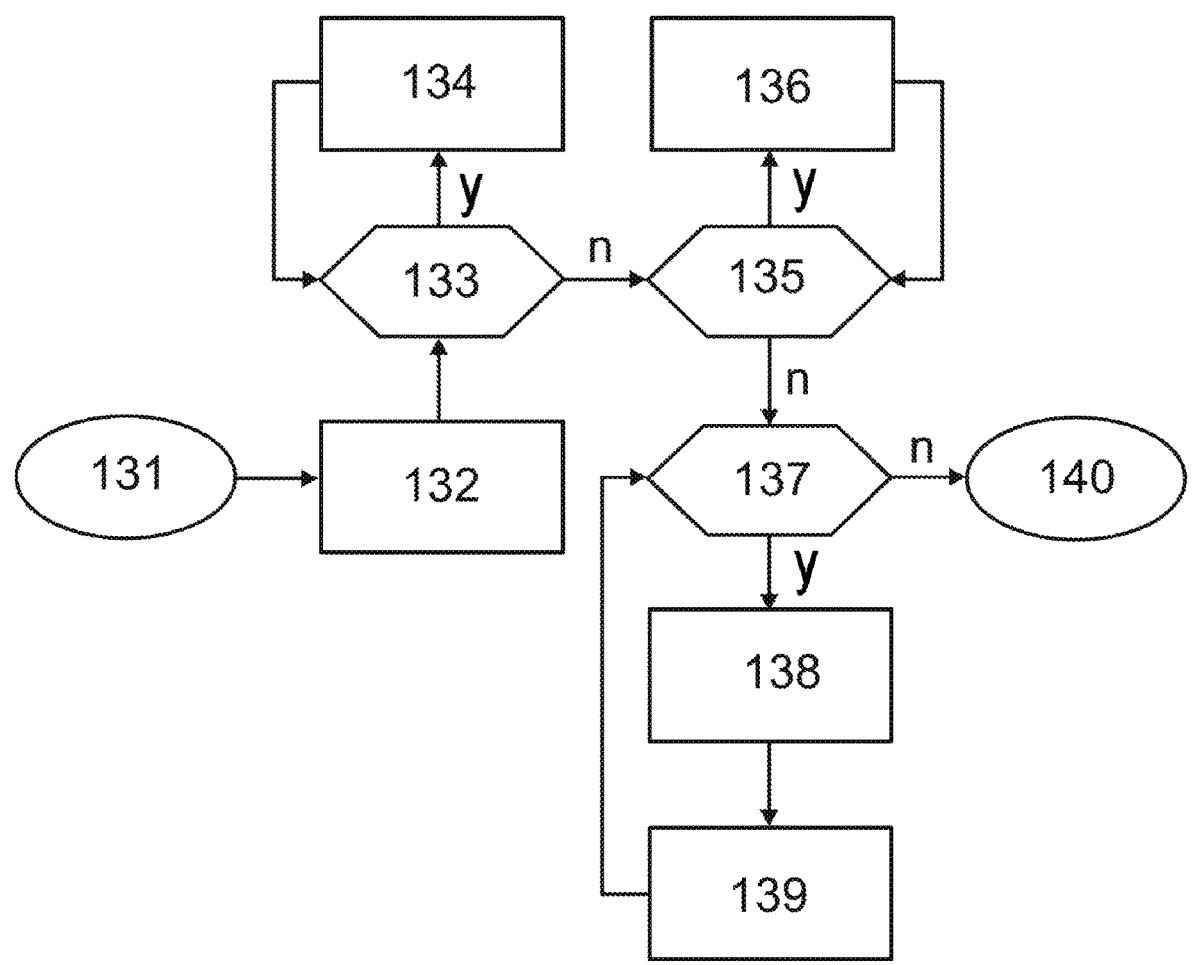
FIG. 15 shows the flowchart for the described first method for planning a lighting facility.

FIG. 15 shows the flowchart for the method described. At point 131, the method is started with step 132, in which the ISO lines of the access points in a system are computed for a predetermined reference plane. Once this has been done, the test 133 checks whether there are areas that are not covered in the room. This naturally requires the planning tool to consult the floor plan of the building, which stores the outline and the position of the access points. If there are areas that are not covered, then step 134 checks which access point best covers the areas not covered hitherto when the transmission power is increased. This access point is located and the necessary ISO line and the associated transmission power are computed as appropriate. The process then returns to the test 133, and step 134 is repeated until there are no further areas that are not covered. Once there is full coverage, the test 135 establishes whether there are reducible areas, that is to say whether the coverage by particular access points may be reduced because the coverage by other access points has been increased. If this is the case, step 136 looks at the access point whose area may be decreased to the greatest extent without creating a new free area. The ISO line and transmission power of said access point are subsequently computed and the test 135 is repeated. Step 136 is begun by the test 135 until there are no further access points whose power could be reduced.

If this is the case, the test 137 checks whether there are as yet uncomputed access points. If this is the case, an access point that has not yet been computed is chosen in step 138. In step 139, the ISO line of said access point and the associated transmission power are then computed. The ISO line is computed as the minimum line at which the minimum signal strength of e.g. −74 dB is achieved everywhere. The process then jumps to the test 137 again. Steps 138 and 139 are repeated until all access points have been computed. Once all access points are computed the method is terminated at point 140. It should be noted that, in the present embodiment, an access point AP #1 . . . AP #N may be equated to a lamp 5, since the invention is based on an access point being present in every lamp 5, of course. However, the method may naturally also be performed with pure access points that are not in a lamp 5.

On the basis of FIGS. 16 to 21, a second application for planning a lighting facility is explained by way of non-limiting example. The lighting facility in this configuration includes a WiFi mesh network, that is to say that, as in the previous configuration, each lamp 5 has an access point. In this case, however, there are also WiFi nodes that are not access points for the end user, but rather are used for the WiFi infrastructure.

Figure 22:
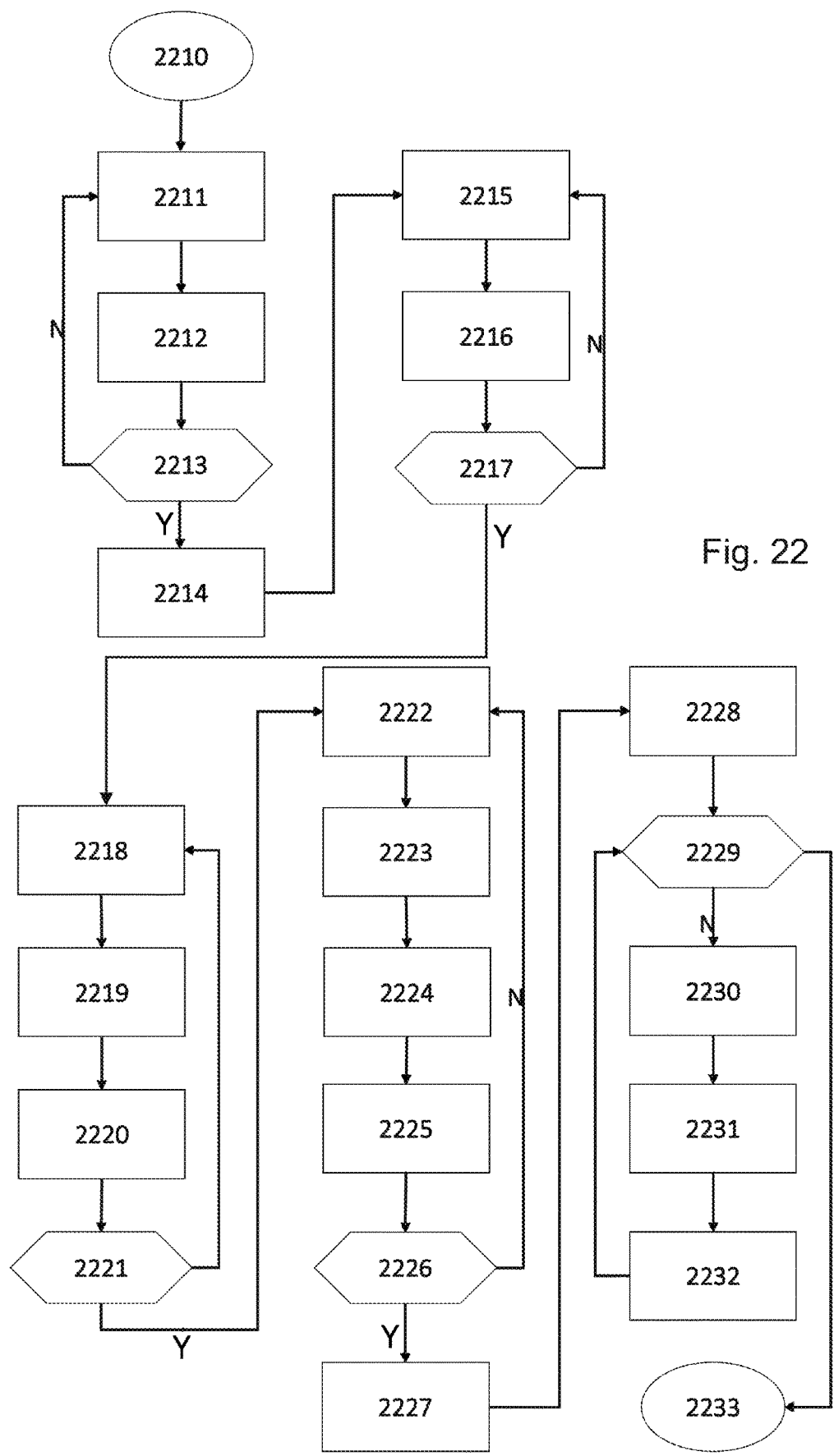
FIG. 22 shows the flowchart for the described second method for planning a lighting facility.

FIG. 22 shows a flowchart for a second method for planning the lighting facility.

Figure 16:
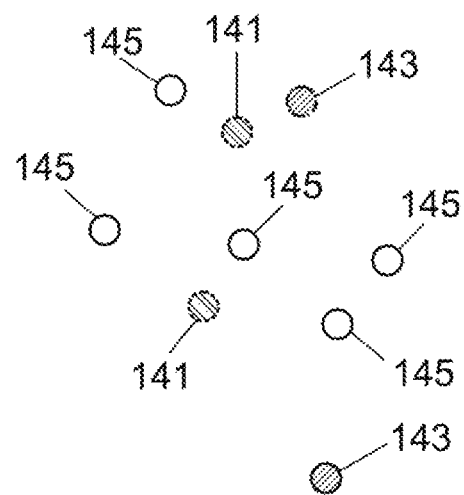
FIG. 16 shows an arrangement of access points in a lighting system that is to be set up.
Figure 17:
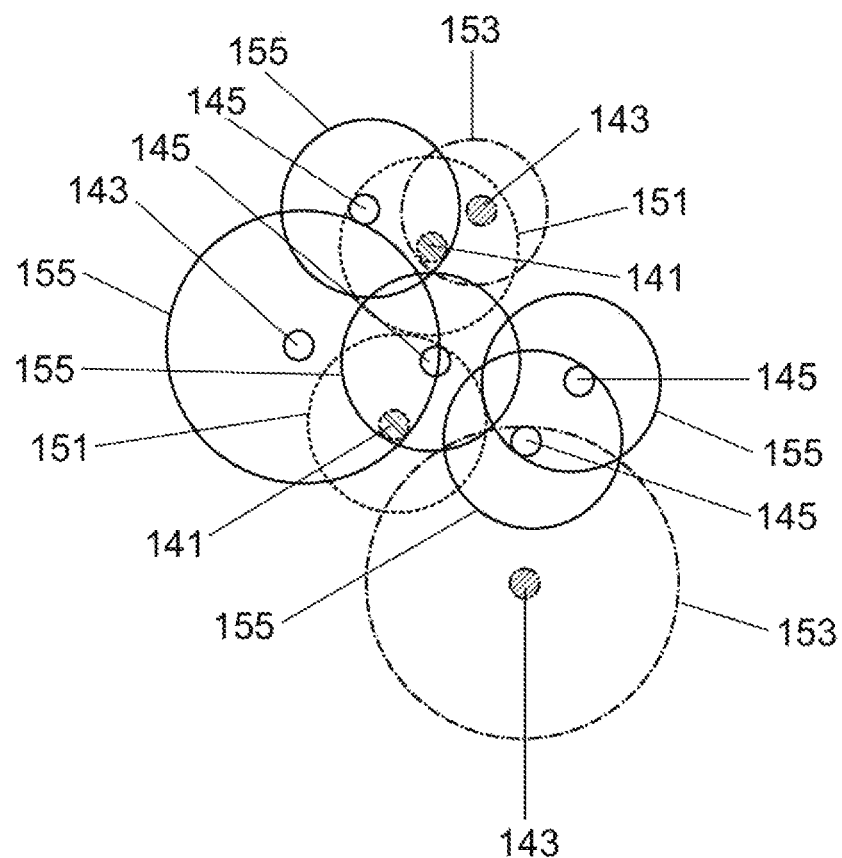
FIG. 17 shows the situation in which each node sees precisely one neighbor, the ranges of the access points being entered as circles 151, 153 and 155 in the figure.

In a second non-limiting embodiment of a lamp system having congruent lamps, the WiFi mesh case is considered. The starting point is a network in which not every node or access point has a network connection, which means that these nodes or access points get their network via the WiFi mesh rather than via the wired PoE network. Since all nodes in the network are also access points, only some of which are not available for the end user, the term access point is equated to the term node in the explanation below. In this embodiment, signal strengths are intended to be chosen such that theoretically the maximum data rate is available for each node. The method is conceivable for all wireless mesh networks (WiFi, ZigBee, Thread, Bluetooth, BLE, etc.), but is described below using the non-limiting example of WiFi mesh based on the 802.11s standard. In order to ensure WiFi mesh in the lamp plane, an adequate radiation characteristic for the antenna or, in the case of a multiantenna solution, one or more antennas in this plane is needed. In the case of a single-antenna solution, this may be e.g. a patch antenna; in the case of a two-antenna system, this could be realized using a combination of directional antenna and omnidirectional radiating element. The multiantenna system affords the advantage of continuing to use the previous presented method in order to optimize the signal strengths of the cells in the main direction. Only the case in the horizontal plane (e.g. along the ceiling of a building floor) will now be taken into consideration below. First of all, we look at the implementation of a WiFi mesh network based on IEEE 802.11s. The standard regulates the dynamic routing and channel access of the mesh network. In this case, three different types of access points are classified. Access points 143, which act as a gateway to the actual network (MPP), access points 141, which are available both for the usable network and for routing (MAP), and access points 145, which are available just for routing (MP). Access points 145, which are available only for routing, share a channel with their adjacent partners. It quickly becomes evident from this that such a mesh network may quickly reach the limits for access methods. Conversely, however, it must be guaranteed that every access point sees at least one neighbor and that there is a route to an MAP. Any lamp may take on the role of an MP or MAP, but only lamps 5 having a connection to the superordinate network may be an MPP 143. Moreover, there is also supposed to be the optional possibility of defining particular access points as hotspots with a likewise optionally selectable minimum coverage in the reference plane. The method for setting up a lighting system includes the following steps, which are explained on the basis of FIGS. 16 to 21 (only the horizontal lamp plane is considered in this case, not the underlying cell). The text below also refers to the flowchart in FIG. 22:

1. The method begins in step 2210. In step 2211, a node is first of all selected, and in step 2212 a radius is ascertained as a range in order to achieve another permanently set value as signal strength, e.g. −74 dBm. In this case, care is taken to ensure that the current node reaches the closest node in this case. The test 2213 tests whether all nodes have already been passed through. If not, the process jumps to step 2211 again. FIG. 16 shows an arrangement of access points in a lighting system to be set up. There are two access points 141 that the planner stipulates as a hotspot. There are two access points 143 that may act as a gateway. And there are further access points 145. FIG. 17 shows the situation in which each node sees precisely one neighbor. The ranges of the access points are entered as circles 151, 153 and 155 in the figure.

2. In step 2214, the hotspot access points 141 are now disabled; they have at least one connection to a further node and are optimally not intended to be used for routing. Thus, it is the task of the other nodes to provide a route to the access points 141. As may be seen in FIG. 17, there is no bilateral communication for each node, and in some cases only bilateral communication to an adjacent access point 141, but without a route to a gateway.

3. For each lamp that sees only one access point 141 as a neighbor, it is now necessary for the closest possible further neighbor to be included, which applies for both access points 143 and access points 145. To this end, in step 2215, a node is selected that has only one access point 141 as a neighbor and has not yet gone through step 2215. In step 2216, a neighbor is selected that is not an access point 141, and a radius is ascertained as a range in order to achieve another permanently set value as signal strength, e.g. −74 dBm. The test 2217 checks whether all nodes have gone through step 2215. If this is not the case, the process jumps to step 2215 again. If this is the case, it continues at step 2218.

Figure 18:
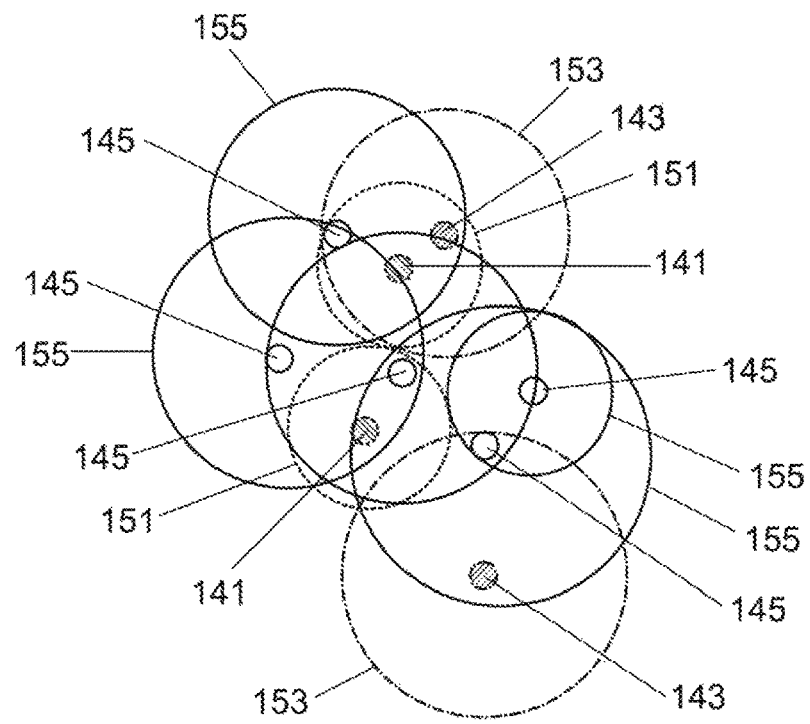
FIG. 18 shows the situation in which each node has two neighbors that it may address in order to set up a route.

4. At this time, each node is guaranteed to be able to send unidirectionally to another node. A check is now performed for each node in steps 2218 to 2220 to determine whether said node is also seen by another node. If this is not the case, a node that has not yet been handled hitherto is first of all selected in step 2218, and in step 2219 the next neighbor that is not a hotspot access point 141 is sought and its range 151, 153, 155 is extended in step 2220 such that it is the opposite number for the node. The test 2221 checks whether all nodes have already been handled, and if not then the process jumps to step 2218. If this is the case, this loop is terminated and the process continues in step 2220. The result of steps 3 and 4 is depicted in FIG. 18.

Figure 19:
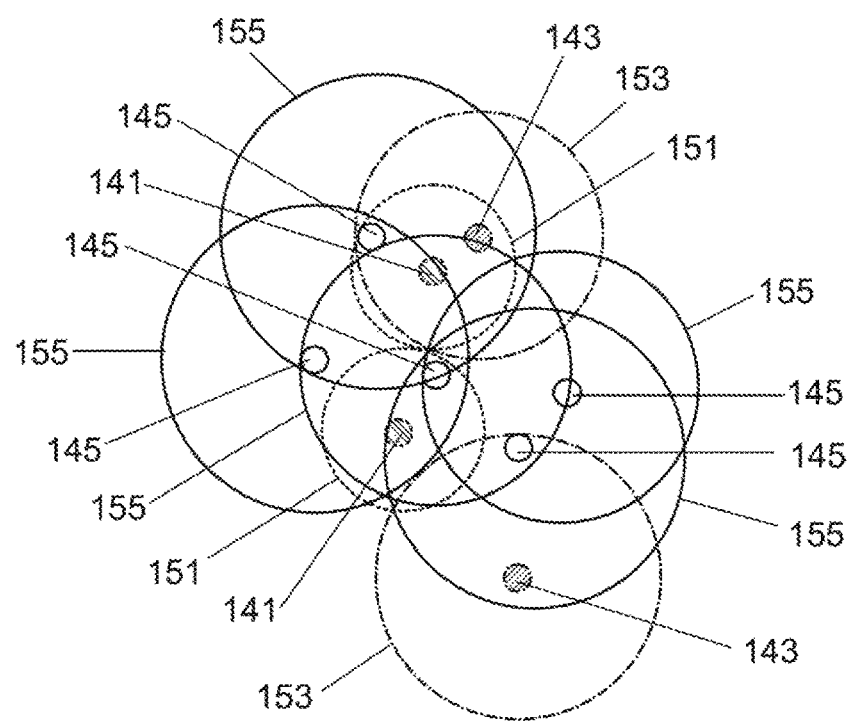
FIG. 19 shows the situation in which each node in the network has at least two neighborhood relationships.

5. In the fifth step, all nodes 145 are now sought that have only one neighborhood relationship. If this is the case, the node 145 would be an end point and would not take part in the routing in the mesh. For each of these nodes, a further next node is included in the range 155. This opposite node likewise needs to be extended in order to support said node as a counterpart. To this end, in step 2222, a node is selected that has not yet been handled. In step 2223, an adjacent node 145 is sought, and nodes 141 and 143 are ignored. In step 2224, a radius is now ascertained again as a range in order to achieve another permanently set value as signal strength, e.g. −74 dBm. For the adjacent node, a radius is likewise ascertained in step 2225 as a range in order to achieve another permanently set value as signal strength, e.g. −74 dBm, so that this node is the opposite number of the handled node. The test 2226 checks whether all nodes have already been handled. If this is not the case, the process jumps to step 2222 again, otherwise it continues at step 2228. FIG. 19 shows the result after this fifth step.

Figure 20:
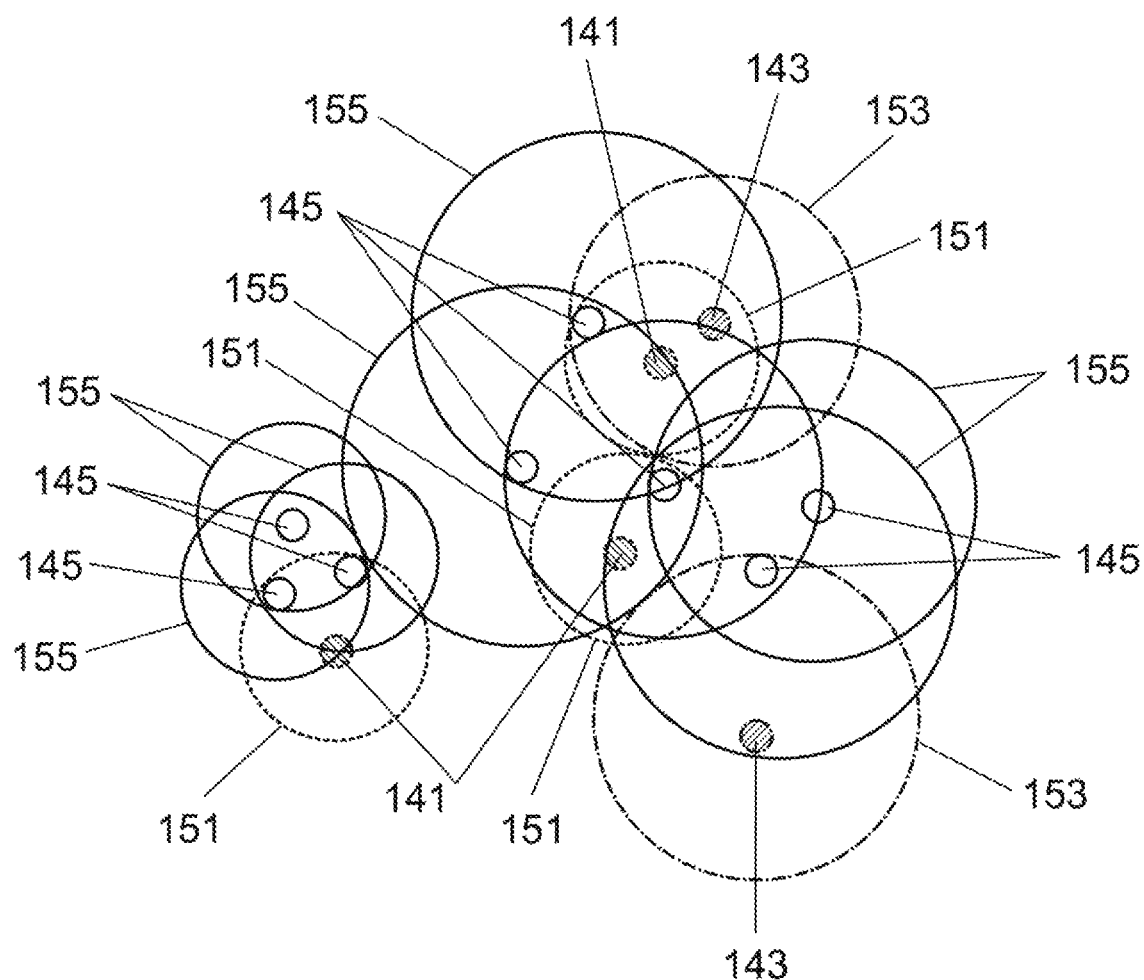
FIG. 20 shows the network of FIG. 17 extended by a cluster.
Figure 21:
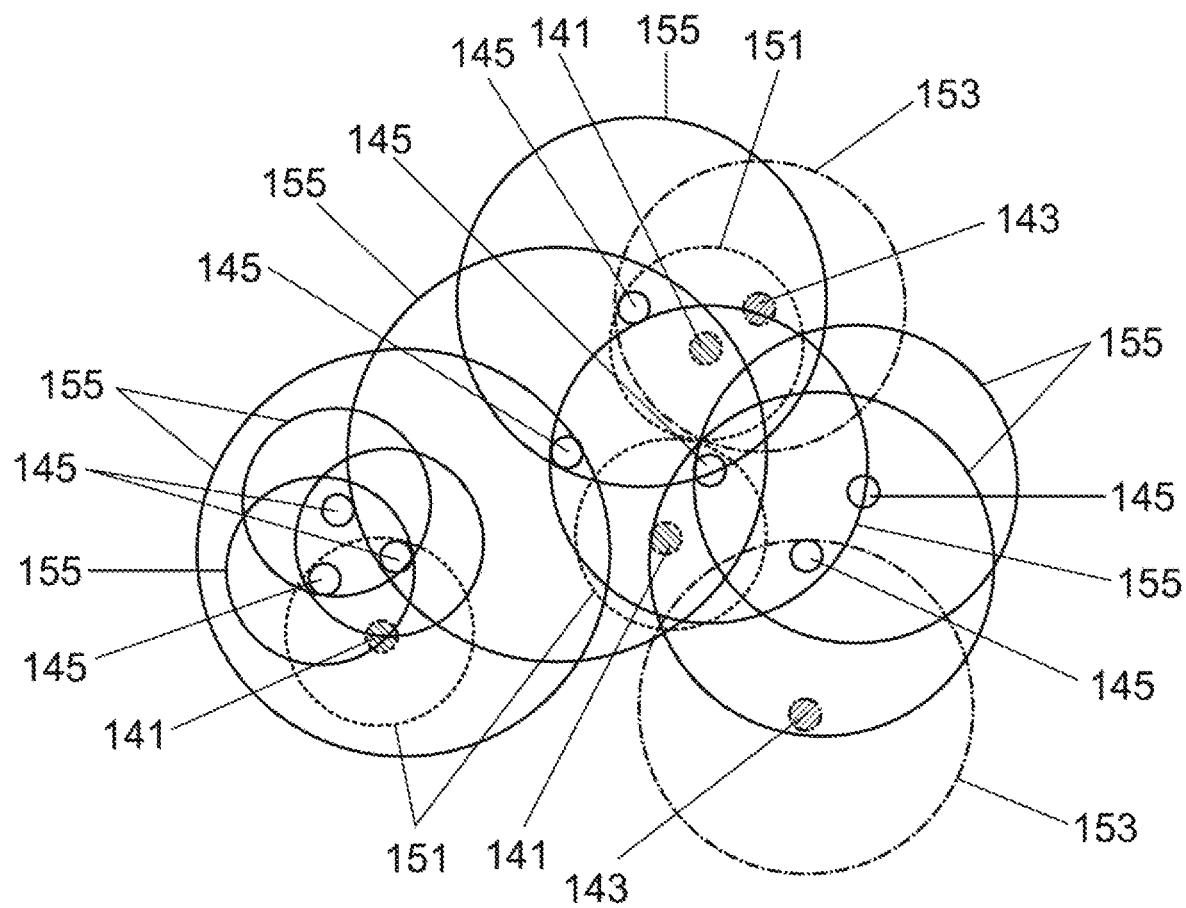
FIG. 21 shows how the method has been used to combine the two clusters from FIG. 20.

6. Finally, for each node, it is necessary to check whether at least one route to an access point node 143 exists. In this case, all nodes that have routes among one another may be combined into clusters. For each cluster, finally the one that, with the smallest range extension to one of its nodes, also includes a further cluster is selected. This node and the matching opposite number are set to this range and the two clusters combined into one. This is repeated until only one cluster remains. To this end, an arbitrary cluster is selected in step 2228. The test 2229 checks whether there is now only one cluster available. If this is the case, the method is terminated at point 2233. If this is not the case, then a node that, with the smallest increase, includes a further cluster is selected in step 2230. In step 2231, the range of this cluster is adjusted such that it is the opposite number of the node. In step 2232, the two clusters now connected are brought together. FIG. 20 shows the previous network extended by a cluster that satisfies all the conditions from steps 1-5. FIG. 21 shows how the method is used to bring the two clusters together. Finally, the path loss model is again used to compute the signal strength and transmission power of every single node. These values are then the final facility values guaranteeing optimum coverage with maximum selectivity between the access points.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE SIGNS

21, 22 Gateways and control computers for the lighting facility
DS Distribution network, internal network
AP #1 . . . AP #N Access points
BSS #1 . . . BSS #N Basis service sets for subscribers on the wireless LAN (WLAN) network
41 Network access points in the lamps
42 Radio holes
81 Light radiation circuit of a lamp on the floor as a reference plane
82 +3° (10%) tolerance line for the radiation area of the radio network
83 −3° (10%) tolerance line for the radiation area of the radio network
84 Reference plane
85 Reference plane
86 Floor reference plane
101 Ceiling panels with a size of 625 mm×625 mm
5 Lamp
51 Input for connecting a network
53 Power supply unit
55 Control unit
57 LED module, light source
59 Access point, network access point
591 Antenna
112, 114, 116 ISO lines
141 Nodes used as access points
143 Nodes with access to the wired network
145 Nodes used for routing
151 Range line of the node 141
153 Range line of the node 143
155 Range line of the node 145

The invention claimed is:

1. A lamp configured to perform a method for optimizing an area coverage of a wireless network, the method comprising:
computing locations having a predetermined field strength for all network access points with reference to a predetermined reference area,
computing whether there are locations on the reference area at which the predetermined field strength is not reached,
if so, increasing the transmission power of a network access point close to the location, repeating computing whether there are locations on the reference area at which the predetermined field strength is not reached and increasing the transmission power of a network access point close to the location until at least the predetermined field strength prevails at all locations,
computing whether there are locations with reducible field strength on the reference area,
if so, reducing the transmission power of the network access point that can be reduced to the greatest extent, repeating computing whether there are locations with reducible field strength on the reference area and reducing the transmission power of the network access point that can be reduced to the greatest extent until there are no further reducible network access points,
checking whether there are as yet uncomputed network access points,
if so, computing an as yet uncomputed network access point, and repeating computing the as yet uncomputed network access point until all network access points have been computed:
the lamp comprising:
an input for connecting the wireless network having an integrated power supply, wherein
the input is Power over Ethernet (POE) compatible, and wherein the PoE compatible input comprises at least electrical power for powering at least one light source and network data for forwarding to an access point via the PoE;
a power supply unit for supplying all components of the lamp with an electric power taken from the PoE compatible input, wherein the power supply unit is configured to isolate the at least electrical power from the network data, and wherein
the power supply unit is configured to provide the electrical power to the at least one light source;
at least one light source configured to receive the electrical power from the power supply unit,
a network access point for providing at least one wireless network, which network access point is configured to receive at least the isolated network data from the power supply unit and coupled to the network via the PoE compatible input, at least one antenna associated with the network access point, wherein
the light source and the at least one antenna are arranged and designed such that a radiation characteristics of the light source are congruent with a radiation characteristics of the at least one antenna of the wireless network referenced to one or more reference areas; wherein
the computing whether there are locations on the reference area at which the predetermined field strength is not reached is based on the congruence between the radiation characteristics of the light source and the radiation characteristics of the at least one antenna.

2. The lamp as claimed in claim 1, further comprising a control unit for controlling the components of the lamp.

3. The lamp as claimed in claim 2, wherein the light source is controlled by the control unit.

4. The lamp as claimed in claim 1, wherein the wireless network is a WLAN network based on the IEEE 802.11 standard.

5. The lamp as claimed in claim 1, wherein the wireless network is a ZigBee network based on the IEEE 802.15.4 standard.

6. The lamp as claimed in claim 1, wherein the wireless network is a Bluetooth network based on the IEEE 802.15.1 standard.

7. The lamp as claimed in claim 1, wherein the network access point uses at least one of the frequency bands provided in the standard: 2.4 GHz, 5 GHz, 60 GHz.

8. The lamp as claimed in claim 1, wherein the at least one antenna is a biquad antenna.

9. The lamp as claimed in claim 1, wherein the network access point is set up to form a mesh network with adjacent network access points.

10. The lamp as claimed in claim 1, wherein the network access point is set up to allow handover of a subscriber to another network access point according to the IEEE 802.11f and/or IEEE 802.11r standard.

11. The lamp as claimed in claim 1, wherein the PoE compatible input is based on one of the standards IEEE 802.3af, IEEE 802.3at, or IEEE 802.3bt.

12. The lamp as claimed in claim 1, wherein the network access point is a radio network access point, and wherein the at least one wireless network is a wireless radio network.

13. The lamp as claimed in claim 12, wherein the wireless radio network is a wireless local area network (WLAN).

14. The lamp as claimed in claim 12, wherein the PoE compatible input connects the radio network access point to the wireless radio network.

15. A lighting facility having multiple lamps, each lamp comprising:
an input for connecting a wireless network having an integrated power supply, wherein
the input is Power over Ethernet (PoE) compatible, and wherein
the PoE compatible input comprises at least electrical power for powering at least one light source and network data for forwarding to an access point via the PoE;
a power supply unit for supplying all components of the lamp with an electric power taken from the PoE compatible input, wherein
the power supply unit is configured to isolate the at least electrical power from the network data, and wherein
the power supply unit is configured to provide the electrical power to the at least one light source;
the at least one light source configured to receive the electrical power from the power supply unit,
a network access point for providing at least one wireless network, which network access point is configured to receive at least the isolated network data from the power supply unit and coupled to the network via the PoE compatible input,
at least one antenna associated with the network access point, wherein
the light source and the at least one antenna are arranged and designed such that a radiation characteristics of the light source are congruent with a radiation characteristics of the at least one antenna of the wireless network referenced to one or more reference areas;
each lamp performs a method for optimizing the area coverage of the wireless network,
the method comprising:
computing locations having a predetermined field strength for all network access points with reference to a predetermined reference area,
computing whether there are locations on the reference area at which the predetermined field strength is not reached,
if so, increasing the transmission power of a network access point close to the location, repeating computing whether there are locations on the reference area at which the predetermined field strength is not reached and increasing the transmission power of a network access point close to the location until at least the predetermined field strength prevails at all locations,
computing whether there are locations with reducible field strength on the reference area,
if so, reducing the transmission power of the network access point that can be reduced to the greatest extent, repeating computing whether there are locations with reducible field strength on the reference area and reducing the transmission power of the network access point that can be reduced to the greatest extent until there are no further reducible, network access points, checking whether there are as yet uncomputed network access points,
if so, computing an as yet uncomputed network access point, and repeating computing the as yet uncomputed network access point until all network access points have been computed; wherein
the computing whether there are locations on the reference area at which the predetermined field strength is not reached is based on the congruence between the radiation characteristics of the light source and the radiation characteristics of the at least one antenna.

16. The lighting facility as claimed in claim 15, characterized in that handover of a subscriber between lamps of the lighting facility takes place according to the IEEE 802.11f and/or IEEE 802.11r standard.

17. The lighting facility as claimed in claim 15 wherein the lamps in the lighting facility form a mesh network.

* * * * *

UNITED STATES PATENT AND TRADEMARK OFFICE
CERTIFICATE OF CORRECTION

Page 1 of 1

PATENT NO. : 10,973,108 B2
APPLICATION NO. : 16/081420
DATED : April 6, 2021
INVENTOR(S) : Michael Eschey et al.

It is certified that error appears in the above-identified patent and that said Letters Patent is hereby corrected as shown below:

In the Claims

Column 16, Line 31, Claim 15: Please delete "reducible, network access points" and insert --reducible network access points-- in place thereof.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*